United States Patent [19]

Cesar

[11] Patent Number: 5,828,318
[45] Date of Patent: Oct. 27, 1998

[54] SYSTEM AND METHOD FOR SELECTING A SUBSET OF AUTONOMOUS AND INDEPENDENT SLAVE ENTITIES

[75] Inventor: Christian Lenz Cesar, Shrub Oak, N.Y.

[73] Assignee: International Business Machines Corporation, Armonk, N.Y.

[21] Appl. No.: 646,539

[22] Filed: May 8, 1996

[51] Int. Cl.[6] .......................... G08C 19/00; G05B 23/02
[52] U.S. Cl. ................ 340/825.69; 340/825.06; 340/825.07; 340/825.08; 395/290; 395/291; 395/683
[58] Field of Search .................. 340/895.69, 825.06, 340/825.07, 825.08, 825.12, 825.71, 571, 572; 395/290, 201, 683

[56] References Cited

U.S. PATENT DOCUMENTS

| | | | |
|---|---|---|---|
| 3,970,824 | 7/1976 | Walton et al. | 235/61 |
| 4,636,950 | 1/1987 | Caswell et al. | 364/403 |
| 4,673,932 | 6/1987 | Ekehian et al. | 340/825 |
| 5,151,684 | 9/1992 | Johnsen | 340/572 |
| 5,231,273 | 7/1993 | Caswell et al. | 235/385 |
| 5,245,534 | 9/1993 | Waterhouse et al. | 364/404 |
| 5,407,050 | 4/1995 | Takemoto et al. | 194/205 |
| 5,410,315 | 4/1995 | Huber | 342/42 |
| 5,434,572 | 7/1995 | Smith | 342/44 |
| 5,489,908 | 2/1996 | Orthmann et al. | 342/42 |
| 5,590,339 | 12/1996 | Chang | 395/750 |

FOREIGN PATENT DOCUMENTS 0585132  3/1994  France .............. G01S 13/78

OTHER PUBLICATIONS

A. R. Grasso, Electronic Remote Identification—A Case Study: IEEE 1990, pp. 14–2.1–14–2.3.

Narain H. Gehani, Broadcasting Sequential Processess (BSP), 1984 IEEE Transactions on Software, Engineering, vol. SE–10, No. 4, 343–351, Jul. 1984.

TRIS (Texas Instruments Registration and Identification System, "Stationary Reading/Writing Unit Reference Manual", Manual No. RI–ACC–UM02–01, pp. 1 to 3.

Set Operations and the Laws of Set Theory, Enumerations in s pp. 45–53.

"Micron RFID Communications Protocol, Pre–Release Version 0.95, 1993 Micron Communications", Inc., pp. 1–71.

DuoProx Multiple Technology Proximity Card, Hughes Identification Devices, DP1330–L Series, pp. 1–2.

"Research Looks Into the Future", Ames Nelson, Think Magazine, Jul./Aug. 1994.

*Primary Examiner*—Michael Horabik
*Assistant Examiner*—Anthony A. Asongwed
*Attorney, Agent, or Firm*—Louis J. Percello; Ronald L. Drumheller

[57] ABSTRACT

A master entity is capable of broadcasting commands to a plurality of three-state-selection machine slaves. Transitions from one state to another are effected on instruction from commands in a sequence of commands broadcast from the master. Slaves move to another state when they satisfy a primitive condition specified in the command. By moving slaves among the three sets, a desired subset of slaves can be isolated in one of the sets. This desired subset of slaves then can be moved to one of the states that is unaffected by commands that cause the selection of other desirable subsets of slaves.

18 Claims, 35 Drawing Sheets

|  | T12 | T21 | T23 | T32 | T31 | T13 |
|---|---|---|---|---|---|---|
| 900 | YES | YES | YES | YES | YES | YES |
| 901 | YES | YES | YES | YES | YES | NO |
| 902 | YES | YES | YES | YES | NO | YES |
| 903 | YES | YES | YES | NO | YES | YES |
| 904 | YES | YES | NO | YES | YES | YES |
| 905 | YES | NO | YES | YES | YES | YES |
| 906 | NO | YES | YES | YES | YES | YES |
| 907 | YES | YES | YES | NO | YES | NO |
| 908 | YES | YES | NO | YES | NO | YES |
| 909 | YES | NO | YES | YES | YES | NO |
| 910 | NO | YES | YES | YES | NO | YES |
| 911 | YES | NO | YES | NO | YES | YES |
| 912 | NO | YES | NO | YES | YES | YES |
| 913 | YES | YES | YES | YES | NO | NO |
| 914 | YES | YES | NO | NO | YES | YES |
| 915 | NO | NO | YES | YES | YES | YES |
| 916 | YES | NO | YES | NO | YES | NO |
| 917 | NO | YES | NO | YES | NO | YES |

FIG. 9

|  | 1810 | STATE 1 | STATE 2 | STATE 3 |
|---|---|---|---|---|
| 1800 |  | 1 | 0 | 0 |
| 1801 | T12(~A) | A | ~A | 0 |
| 1802 | T13(B) | A*~B | ~A | A*B |
| 1803 | T21(B) | A*~B+~A*B | ~A*~B | A*B |

FIG. 18

|  | 1910 | STATE 1 | STATE 2 | STATE 3 |
|---|---|---|---|---|
| 1900 |  | 1 | 0 | 0 |
| 1901 | T12(A) | ~A | A | 0 |
| 1902 | T23(B) | ~A | A*~B | A*B |
| 1903 | T12(B) | ~A*~B | A*~B+~A*B | A*B |

FIG. 19

|  | 2010 | STATE 1 | STATE 2 | STATE 3 |
|---|---|---|---|---|
| 2000 |  | 1 | 0 | 0 |
| 2001 | T13(A) | ~A | 0 | A |
| 2002 | T32(B) | ~A | A*B | A*~B |
| 2003 | T13(B) | ~A*~B | A*B | A*~B+~A*B |

FIG. 20

| 2610 | STATE 1 | STATE 2 | STATE 3 |
|---|---|---|---|
| 2600 | 1 | 0 | 0 |
| 2601  T12(~A) | A | ~A | 0 |
| 2602  T21(~B) | A+~B | ~A*B | 0 |
| 2603  T23(1) | A+~B | 0 | ~A*B |
| 2604  T12(A) | ~A*~B | A | ~A*B |
| 2605  T21(B) | ~A*~B+A*B | A*~B | ~A*B |
| 2606  T23(1) | ~A*~B+A*B | 0 | ~A*B+A*~B |

FIG. 26

| 2710 | STATE 1 | STATE 2 | STATE 3 |
|---|---|---|---|
| 2700 | 1 | 0 | 0 |
| 2701  T12(A) | ~A | A | 0 |
| 2702  T21(~C) | ~A+~C | A*C | 0 |
| 2703  T23(1) | ~A+~C | 0 | A*C |
| 2704  T12(B) | ~A*~B+~B*~C | ~A*B+B*~C | A*C |
| 2705  T21(~C) | ~A*~B+~C | ~A*B*C | A*C |
| 2706  T23(1) | ~A*~B+~C | 0 | A*C+B*C |

FIG. 27

| | 2910 | STATE 1 | STATE 2 | STATE 3 |
|---|---|---|---|---|
| 2900 | | 1 | 0 | 0 |
| 2901 | T12(A) | ~A | A | 0 |
| 2902 | T12(~B) | ~A*B | A+~B | 0 |
| 2903 | T13(1) | 0 | A+~B | ~A*B |
| 2904 | T21(~A) | ~A*~B | A | ~A*B |
| 2905 | T21(B) | ~A*~B+A*B | A*~B | ~A*B |
| 2906 | T23(1) | ~A*~B+A*B | 0 | ~A*B+A*~B |

FIG. 29

| | 3010 | STATE 1 | STATE 2 | STATE 3 |
|---|---|---|---|---|
| 3000 | | 1 | 0 | 0 |
| 3001 | T12(~A) | A | ~A | 0 |
| 3002 | T12(~C) | A*C | ~A+~C | 0 |
| 3003 | T23(1) | 0 | ~A+~C | A*C |
| 3004 | T21(~B) | ~A*~B+~B*~C | ~A*B+B*~C | A*C |
| 3005 | T21(~C) | ~A*~B+~C | ~A*B*C | A*C |
| 3006 | T23(1) | ~A*~B+~C | 0 | A*C+B*C |

FIG. 30

| | 3210 | STATE 1 | STATE 2 | STATE 3 |
|---|---|---|---|---|
| 3200 | | 1 | 0 | 0 |
| 3201 | T12(~A) | A | ~A | 0 |
| 3202 | T21(~B) | A+~B | ~A*B | 0 |
| 3203 | T32(1) | A+~B | ~A*B | 0 |
| 3204 | T13(A) | ~A*~B | ~A*B | A |
| 3205 | T31(B) | ~A*~B+A*B | ~A*B | A*~B |
| 3206 | T23(1) | ~A*~B+A*B | 0 | ~A*B+A*~B |

FIG. 32

| | 3310 | STATE 1 | STATE 2 | STATE 3 |
|---|---|---|---|---|
| 3300 | | 1 | 0 | 0 |
| 3301 | T12(A) | ~A | A | 0 |
| 3302 | T21(~C) | ~A+~C | A*C | 0 |
| 3303 | T32(1) | ~A+~C | A*C | 0 |
| 3304 | T13(B) | ~A~B+~B*~C | A*C | ~A*B+B*~C |
| 3305 | T31(~C) | ~A*~B+~C | A*C | ~A*B*C |
| 3306 | T23(1) | ~A~B+~C | 0 | A*C+B*C |

FIG. 33

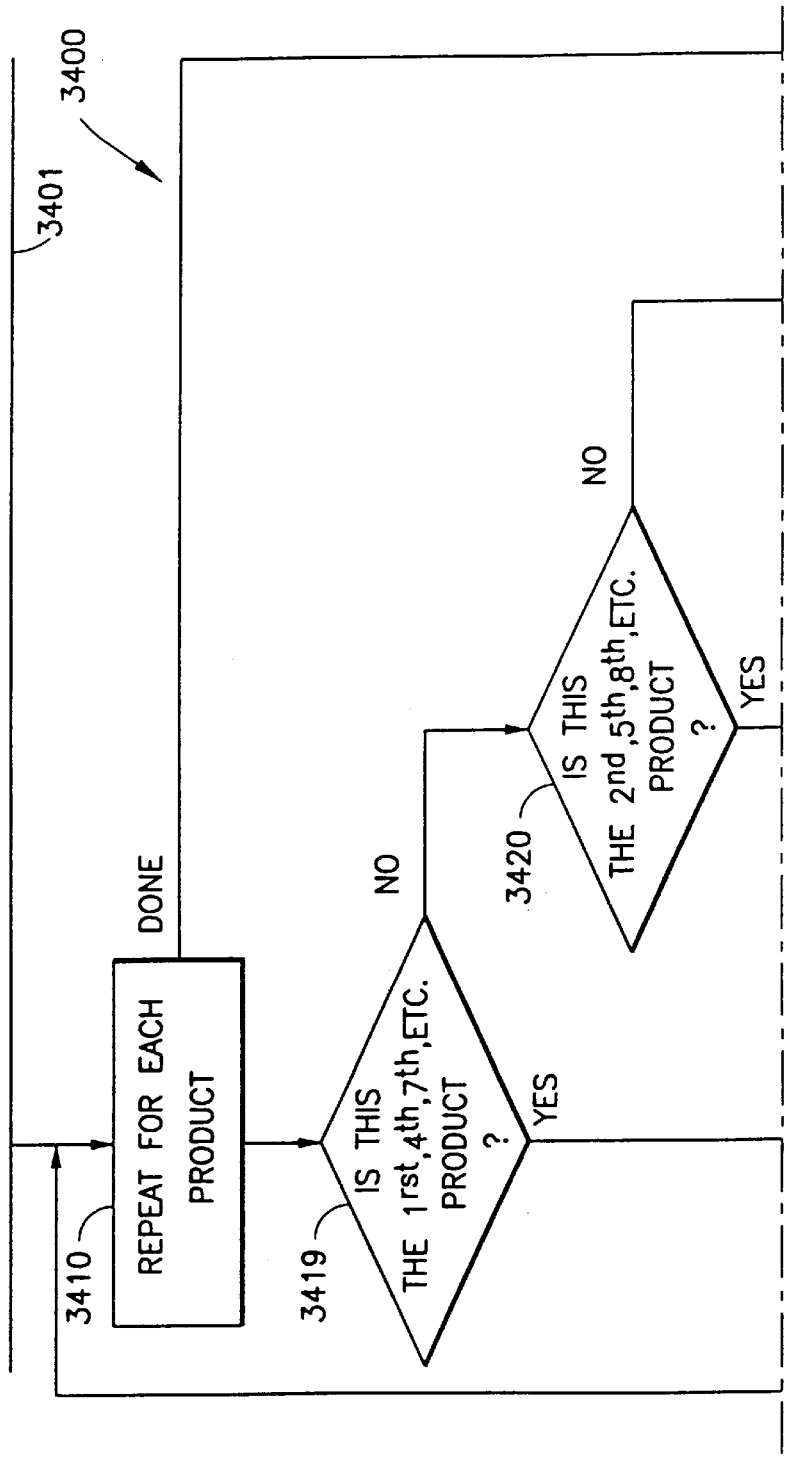

|  | 3510 | STATE 1 | STATE 2 | STATE 3 |
|---|---|---|---|---|
| 3500 |  | 1 | 0 | 0 |
| 3501 | T12(A) | ~A | A | 0 |
| 3502 | T12(~B) | ~A*B | A+~B | 0 |
| 3503 | T31(1) | ~A*B | A+~B | 0 |
| 3504 | T23(~A) | ~A*B | A | ~A*~B |
| 3505 | T23(B) | ~A*B | A*~B | ~A*~B+A*B |
| 3506 | T12(1) | 0 | ~A*B+A*~B | ~A*~B+A*B |

FIG. 35

|  | 3610 | STATE 1 | STATE 2 | STATE 3 |
|---|---|---|---|---|
| 3600 |  | 1 | 0 | 0 |
| 3601 | T12(~A) | A | ~A | 0 |
| 3602 | T12(~C) | A*C | ~A+~C | 0 |
| 3603 | T31(1) | A*C | ~A+~C | 0 |
| 3604 | T23(~B) | A*C | ~A*B+B*~C | ~A*~B+~B*~C |
| 3605 | T23(~C) | A*C | ~A*B*C | ~A*~B+~C |
| 3606 | T12(1) | 0 | A*C+B*C | ~A*~B+~C |

FIG. 36

|  | E1 | E2 | E3 |
|---|---|---|---|
| 3900 — | 1 | 0 | 0 |
| 3901 — T12(A) | ~A | A | 0 |
| 3902 — T12(B) | ~A*~B | A+B | 0 |
| 3903 — T21(~C) | ~A*~B+~C | (A+B)*C | 0 |

(column header 3910)

FIG. 39

|  | E1 | E2 | E3 |
|---|---|---|---|
| 4000 — | 1 | 0 | 0 |
| 4001 — T12(~A) | A | ~A | 0 |
| 4002 — T21(B) | A+B | ~A*~B | 0 |
| 4003 — T12(~C) | (A+B)*C | ~A*~B+~C | 0 |

(column header 4010)

FIG. 40

SYSTEM AND METHOD FOR SELECTING A SUBSET OF AUTONOMOUS AND INDEPENDENT SLAVE ENTITIES

FIELD OF THE INVENTION

The invention relates to communications between a master station and one or more slave stations. More specifically, the invention relates to a master station selecting subset(s) of the slave stations by broadcasting commands with conditions that the selected slaves meet.

BACKGROUND OF THE INVENTION

In the prior art, a master control unit is to communicate with a plurality of autonomous and independent slaves. In such environment, the number of slaves is often not known a priori. There may in fact be no slaves with which the master can communicate. Among the reasons the master may have to communicate with the slaves are (a) the need to acknowledge their presence, (b) identify and count them and/or (c) order them to perform tasks. This kind of computational environment falls under the broader category of broadcasting sequential processes, which is defined by Narain Gehani in Chapter 9 of the book co-edited with Andrew McGettrick, "Concurrent Programming" (Addison-Wesley, 1988), which is herein incorporated by reference in its entirety.

Because the master often does not know ahead of time the number of slaves present and because that number may be very large and possibly unyieldy, it is advantageous for the master to be able to select a subset of the slaves with whom to communicate further. Such a selection must of course be done by a conditional. Those slaves that meet the condition are thus considered selected, while those that do not meet the condition are considered not selected. The selection is performed by broadcasting to all slaves the condition that must be met. This is akin to asking those among a large crowd of people whose last name is Lowell to raise their hand. Each slave is defined has having at least the capability to listen to the master's broadcasts, to receive the broadcast condition and to self-test so as to determine whether it meets the condition. See for example, U.S. patent application No. 08/303,965, entitled "Radio Frequency (RF) Group Select Protocol" to Cesar et al. filed on Sep. 9, 1994 which is herein incorporated by reference in its entirety.

Practical environments where this computational model can be applied include bus arbitration, wireless communication, distributed and parallel processing.

Characteristic of such environments is the existence of a protocol for how master and slaves communicate. The aforementioned capability of subset selection can be an important additional component of that protocol.

Finite state-machines are a well-known modelling tool. The set theory that often accompanies the definition of finite state-machines is also well known. Both subjects are amply covered in any of many books on discrete or finite mathematics that are available today. The book by Ralph Grimaldi, "Discrete and Combinatorial Mathematics: An Applied Introduction" (Addison-Wesley, 1985), is a fine example of its kind.

STATEMENT OF PROBLEMS WITH THE PRIOR ART

In the prior art, the methods used for selecting subsets of slaves is limited to comparisons against the information held by the slaves such that the comparison is either true or false and the slaves can be in either of two selection states: selected or not selected. The slave may contain many other states, but only two are effectively dedicated to the purpose of subset selection.

In some older prior art, a comparison will override a previous comparison. There is no notion of accumulating and combining successive comparisons to effect a selection according to a complex condition.

More recent prior art allows slaves to move between two selection states according to successive comparisons. That allows some complex conditions to be effected. However not all complex conditions can be effected with such two-selection-state machine. For example, the complex condition "is-red and is-not-tall or is-not-red and is-tall", that is, the EXCLUSIVE-OR of the two simple comparisons "is-red" and "is-tall", can not be performed such that the subset of slaves that satisfy the EXCLUSIVE-OR are in the first state and those that do not satisfy the EXCLUSIVE-OR are in the second state. In the case of complex conditions involving two comparisons and their negation, the two-selection-state machine can not perform the EXCLUSIVE-OR and the EQUIVALENCE logical operators. In the case of complex conditions involving more than two comparisons and their negation, the two-selection-state machine can not perform an increasingly large number of logical equations.

In the prior art, conditions such as the EXCLUSIVE-OR must be broken up into two independent processing steps. First, slaves satisfying the first AND term are selected and all necessary processing sequence is performed over them. Second, after a general reset, slaves satisfying the second AND term are selected and the same necessary processing sequence is repeated over those. That means that the processing sequence must be broadcast twice. In the case of more complicated conditions, rebroadcasting of such sequence may happen more than twice. For example, the condition $(A*\sim B*\sim C)+(\sim A*B*\sim C)+(\sim A*\sim B+C)$ would need three rebroadcasts.

The only conditions that can be executed in a single round of broadcasting by a two-selection-state logic as used by the prior art are those conditions that can be expressed by a left-nested expression, such as $((A+B+C)*D*E)+F)$. OR conditions, such as $(A+B+C+D)$, and AND conditions, such as $(A*B*C)$, are particular cases of left-nested expressions. In contrast, EXCLUSIVE-OR type conditions, such as $(A*B*\sim C)+(A*\sim B*C)*(\sim A*B*C)$, can not be written as left-nested expressions and therefore can not be handled by the two-selection-state logic.

Among the prior art is U.S. Pat. No. 5,434,572, entitled "System and Method for Initiating Communications between a Controller and a Selected Subset of Multiple Transponders in a Common RF Field" to Smith dated Jul. 18, 1995. The method begins by selecting all "transponder" in a field and, by a sequence of commands, incrementally moving groups of slaves to a "reset" condition.

In the U.S. Pat. No. 5,410,315, entitled "Group-Addressable Transponder Arrangement" to Huber dated Apr. 25, 1995, a selection is essentially made through a comparison against a "group and/or unit address". Unlike Smith, there is no progressive incremental refinement. Huber can perform only limited AND operations.

OBJECTS OF THE INVENTION

An object of this invention is a system and method for using arbitrarily complex logical conditions to select slave stations that satisfy those conditions transmitted by a master station through a series one or more commands.

An object of this invention is a system and method for using arbitrarily complex logical conditions to select RF transponders that satisfy those conditions transmitted by a base station through a series one or more commands.

SUMMARY OF THE INVENTION

The present invention is a system and method for selecting a subset of a plurality of autonomous and independent slaves, wherein each slave comprises (i) a three-state machine dedicated to selection, (ii) some other stored information, and (iii) a logic to execute externally provided commands in a command sequence that exercise the three-state machine. The primary purpose of the commands is to effect state transitions. The slave receives the command, which causes a comparison to be performed against the slave's stored information, the results of which possibly causing a state transition in the slave.

The commands, in a sequence called a command sequence, are broadcast from at least one master control unit to zero or more slaves. The exact number of slaves may not be known by the master. The master executes a method by which a sequence of discrete commands is broadcast to all slaves. The overall purpose of the method is to bring a subset of the slaves to be at the same state of their three-state machine, while all other slaves are at any one of the two other remaining states.

A three-state machine dedicated to selection is present in every slave. Each slave is at one of those three states, therefore, at any one time, the slaves can be sub-divided into three subsets: those slaves that have their selection three-state machine at the first state, those at the second state, and those at the third state. In a preferred embodiment, transitions are possible between any two states of the three-state machine. Transitions are requested by command (sequence) broadcast from the master. A command specifies a desired transition, say from the second state to the first state. Only slaves that are at the second state may be affected. The command also specifies a condition under which the transition will occur. If the condition is met, the transition is effected; if not, the slave remains in its previous state.

In a preferred embodiment, slaves can be moved from a first state to a second state and visa versa. Only slaves in the second state can be moved to a third state. The slaves in the third state ignore the remaining commands in the command sequence. In alternative preferred embodiments, the first and second states reverse roles after an end of one or more subsequences in the sequences of commands. Also, the second and third states can reverse roles after an end of one or more subsequences. Further, the states of the slaves can cycle their roles at the end of one or more of the subsequences.

BRIEF DESCRIPTION OF THE DRAWINGS

The foregoing and other objects, aspects and advantages will be better understood from the following detailed description of preferred embodiments of the invention with reference to the drawings that are included:

FIG. 9 lists all possible three-state machines that can be used for the purposes of this invention.

FIGS. 18, 19 and 20 show sequences of commands for selecting a subset of slaves that satisfy an EXCLUSIVE-OR condition and such that those slaves end up in a first, second and third set, respectively FIG. 21 describes a method that computes a product (AND) condition.

FIGS. 26 and 27 exemplify the use of the method described in FIG. 25.

FIGS. 29 and 30 exemplify the use of the method described in FIG. 28.

FIGS. 32 and 33 exemplify the use of the method described in FIG. 31.

FIGS. 35 and 36 exemplify the use of the method described in FIG. 31.

FIG. 39 exemplifies the use of the method described in FIG. 37.

FIG. 40 exemplifies the use of the method described in FIG. 38.

DETAILED DESCRIPTION OF THE INVENTION

Figure 1:
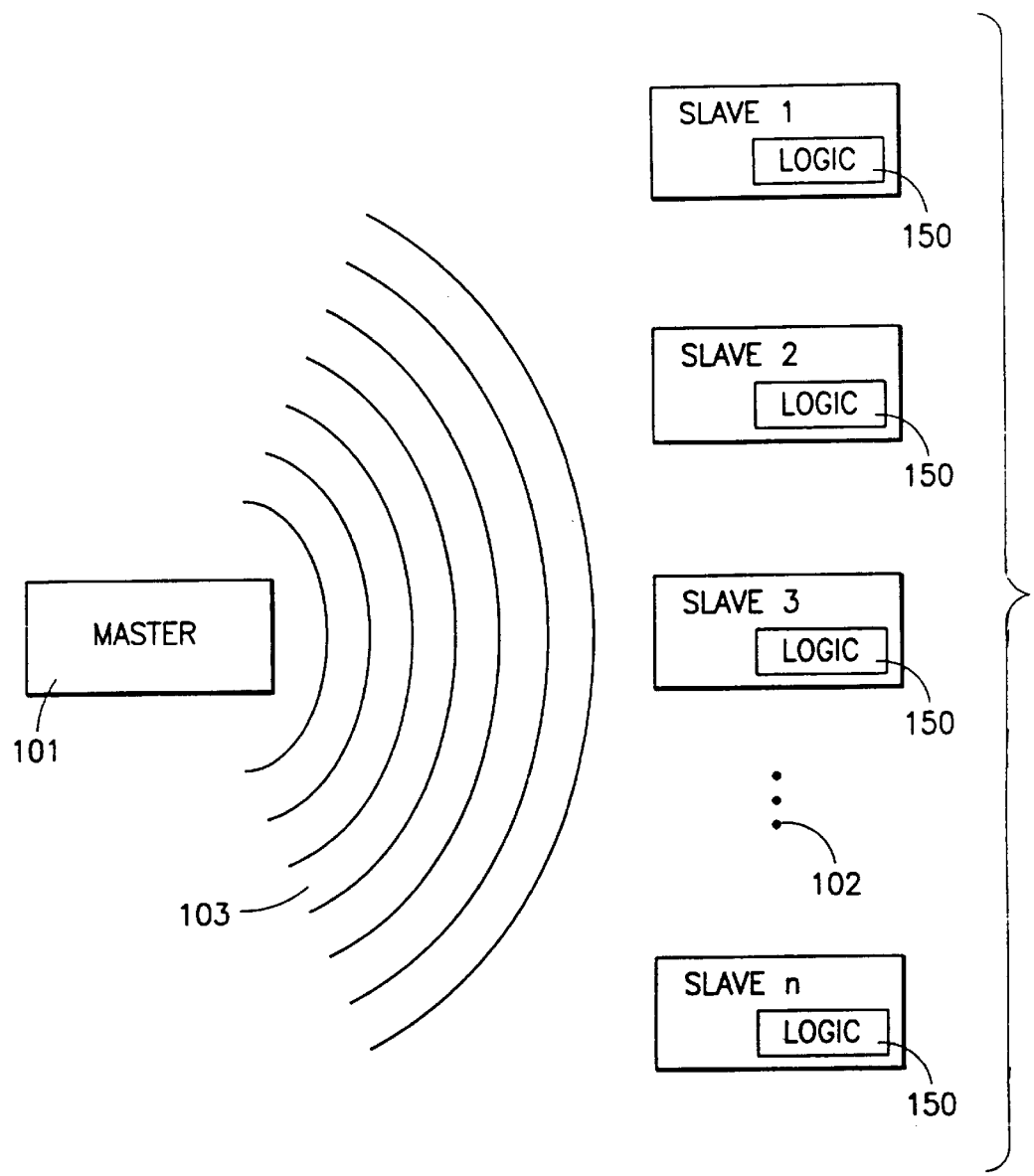
FIG. 1 is a block diagram of a master control unit broadcasting commands to a plurality of slaves.

FIG. 1 shows least one master control unit 101 communicating with a plurality of autonomous and independent slaves 102. The communication medium 103 can be in terms of either direct electric contact means or electromagnetic radiation means, e.g., radio frequency (RF) embodiments. However, it also encompasses light, sound and other frequencies utilized for signalling purposes. Master unit 101 is capable of broadcasting commands at the plurality of slaves 102 via communication medium 103. Each slave is capable of receiving the broadcast commands which are processed by logic 150. For example, U.S. Pat. No. 4,656,463 to Anders et al. shows an RF tag systems where for our purposes the active transceiver (AT) would be the master control unit 101, the passive transceivers (PT) would be the independent slaves 102, and the communication medium 103 would be RF over free space. In an alternative preferred embodiment, U.S. Pat. No. 5,371,852 to Attanasio et al. shows a cluster of computers where for our purposes the gateway would be the master unit 101, the nodes in the cluster would be the slaves 102, and the communication medium 103 would be the interconnect. These references are incorporated by reference in their entirety.

Figure 2:
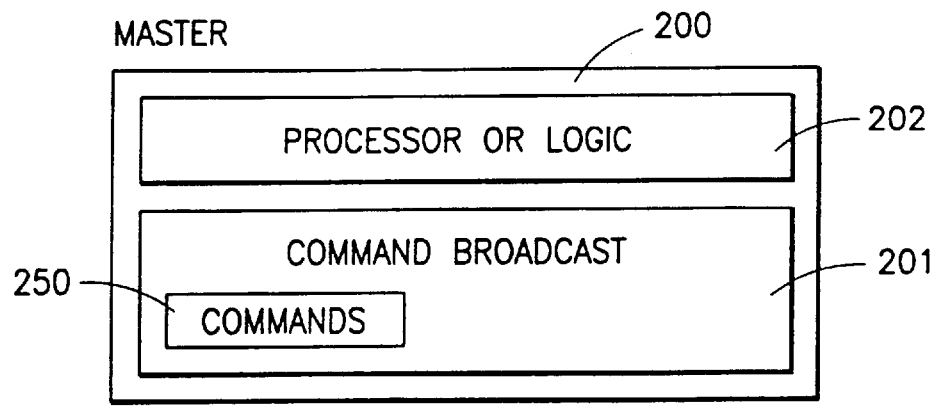
FIG. 2 is a block diagram of the components of a master control unit.

FIG. 2 shows that a master unit 200 comprises (a) means 201 for broadcasting commands from a command set 250 to a plurality of slaves, and (b) processing means 202 for determining the correct sequence of commands to be broadcast. In one embodiment, processing means 202 are proximate to broadcast means 201. Other embodiments are possible where processing means 202 and broadcast means 201 are remote from each other.

Figure 3:
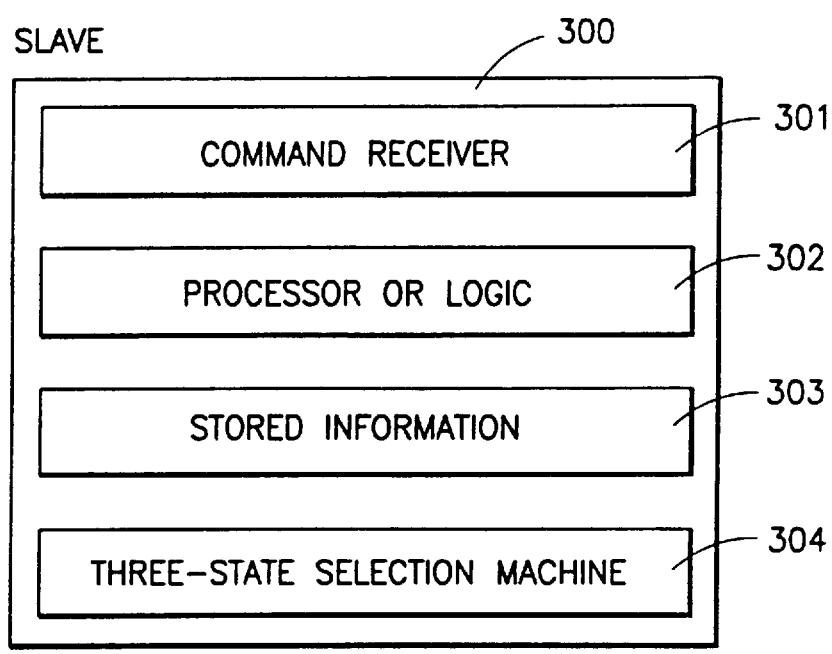
FIG. 3 is a block diagram of the components of a slave.

FIG. 3 shows that a slave 300 comprises (a) a receiver 301 for receiving commands from a master, (b) a three-state machine 304, (c) a memory with stored information 303 (d) processor or logic 302 for executing any received command, performing any condition testing over the stored information 303 as specified by the command, and effecting a state transition on three-state machine 304 conditional to the result of the condition testing. Receiving means 301 and broadcasting means 201 must be necessity be compatible. The receiving means 301 are well known. For example in RF tagging, radio frequency receivers/transmitters are used. In the networking arts standard connections to networks and/or information buses are used. Stored information 303 is typically embodied in the form of registers and/or memory.

The three-state machine 304 comprises a select state, a first unselect state, and a second unselect state state. All three of these states can be used in the selection and unselection of sets of slaves. The logic 302 is further described below.

The significant difference between a two and a three-selection-state machine is that, using any sequence of commands, the former can only isolate or select slaves that satisfy a condition expressed by a left-nested expression. Using a two-selection-state machine, there is no sequence of commands that can process conditions that are expressed as as a SUM-of-left-nested-expressions.

Only a three-selection-state machine can select slaves that satisfy a condition expressed by a sum-of-left-nested-expression. Further, a three-selection-state machine is also sufficient to select a set of slaves that satisfy any arbitrary condition, even though those conditions are expressed by a sum-of-left-nested-expression. Therefore adding a fourth, fifth, etc. state does not add any new capability to the selection logic. In addition, since any condition can be expressed by a sum-of-left-nested expression, a three-selection-state machine can select a set of slave satisfying any possible condition. This capability is undisclosed and unrecognized in the prior art.

The invention enables this capability because a separate condition (or set of conditions), each corresponding to a set of slaves, can be isolated in any one of the three states at any given time. Therefore, operations on two sets of conditions, in two of the respective states, can be performed without affecting or being affected by the conditions held in the third state.

In one embodiment, receiving means 301, processing means 302, stored information 303, and three-state machine 304 are proximate. Other embodiments are possible where the components 301, 302, 303 and 304 are remote from each other, in part or completely.

The three states are dedicated to the process of determining whether a slave satisfies an arbitrarily complex condition. During the process of determining whether the slave satisfies the condition, the slave may be in any of the three states as dictated by the process. If the slave does not satisfy the condition, the process assures that the slave will end up at a state that enables the slave to communicate further with the master.

Figure 4:
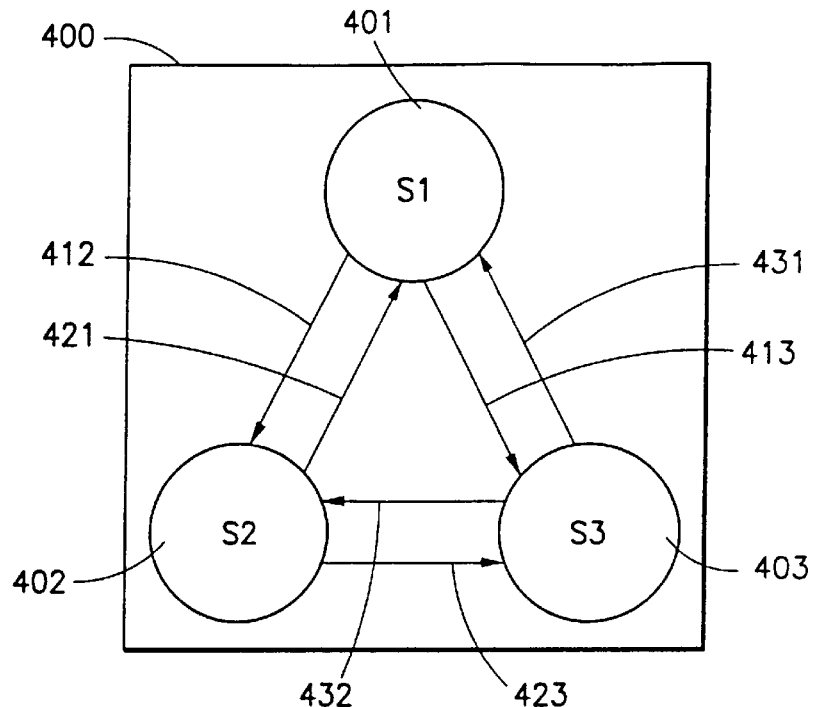
FIG. 4 shows a state diagram showing a three-state machine that allows all six possible transitions between any two different states.

Three-state machine 304 is part of every slave. A preferred three-state machine is shown in FIG. 4. Three-state machine 400 includes the three states 401, 402 and 403, and all six possible state-to-state transitions 412, 413, 421, 423, 431 and 432, where the transitions are between two different states. The three states 401, 402 and 403 are named S1, S2 and S3, respectively. A transition from a state to itself is not helpful for the methodology described herein.

Figure 5:
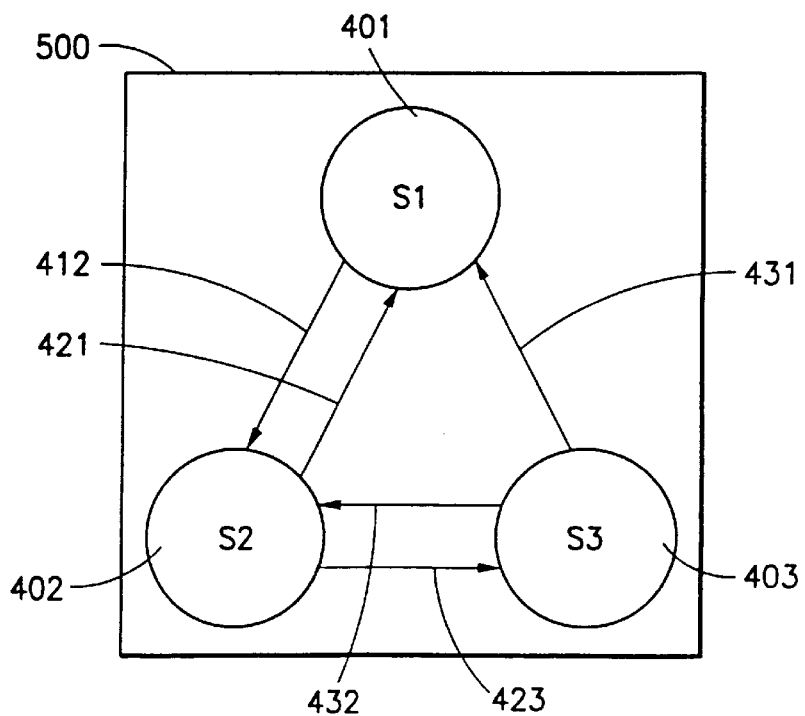
FIG. 5 shows a state diagram showing a three-state machine that allows five possible transitions between any two different states.

Other three-state machines are possible. In FIG. 5, three-state machine 500 has only five of the six state-to-state transitions present in three-state machine 400. Three-state machine 500 represents a class of six possible three-state machines where one of the six possible state-to-state transitions is inoperative. In the particular case of FIG. 5, transition 413 is inoperative.

Figure 6:
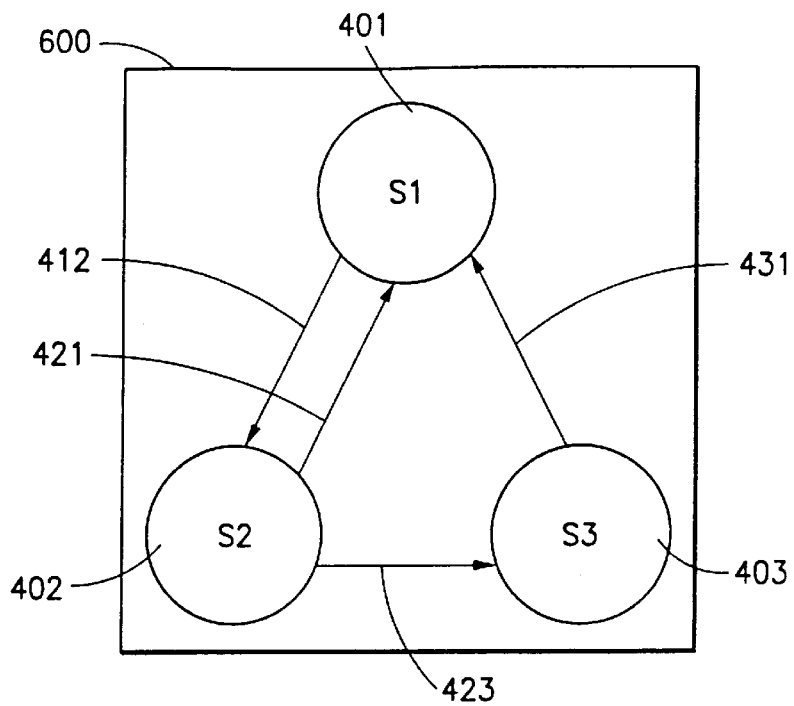
FIG. 6 shows a state diagram showing a three-state machine that allows four possible transitions between any two different states, such that any state is reachable from any other state.

In FIG. 6, three-state machine 600 has only four of the six state-to-state transitions of three-state machine 400. The four operative transitions are such that any state can be reached from another state by means of one or two transitions. Moreover there is at least one possible transition between any two states. Three-state machine 600 represents a class of six possible three-state machines were two of the six possible state-to-state transitions are inoperative, while still providing access to any state from any other state. In the particular case of FIG. 6, transitions 413 and 432 are inoperative.

Figure 7:
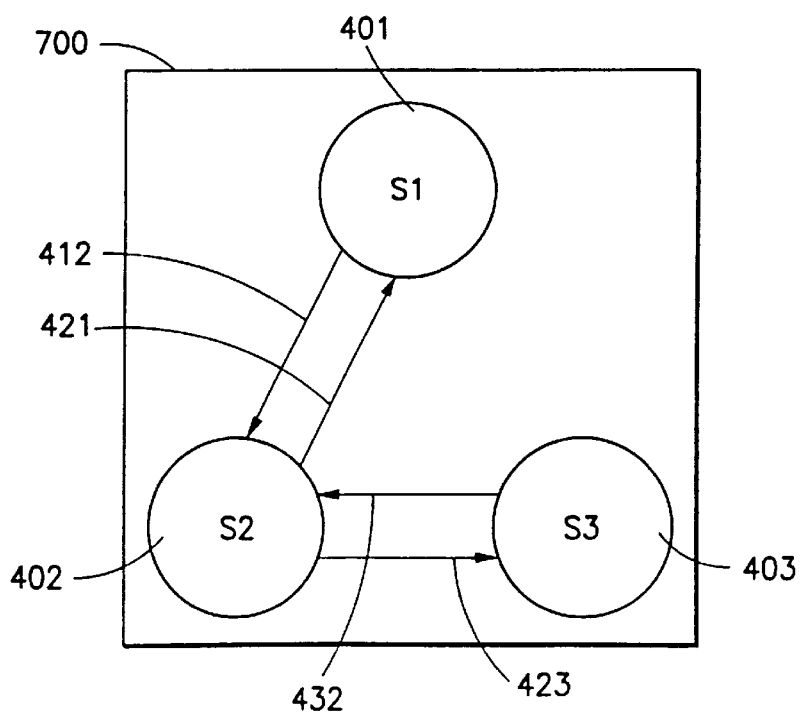
FIG. 7 shows a state diagram showing a three-state machine that allows four possible transitions between any two different states, such that any state is reachable from any other state and two of the states have no transitions between them.

In FIG. 7, three-state machine 700 has only four of the six state-to-state transitions of three-state machine 400. The four operative transitions are such that any state can be reached from another state by means of one or two transitions. Moreover there are two states between which there is no possible transition. Three-state machine 700 represents a class of three possible three-state machines where one of the pairs of transitions between two states is inoperative. In the particular case of FIG. 7, the pair of transitions 413 and 431 between states 401 and 403 is inoperative.

Figure 8:
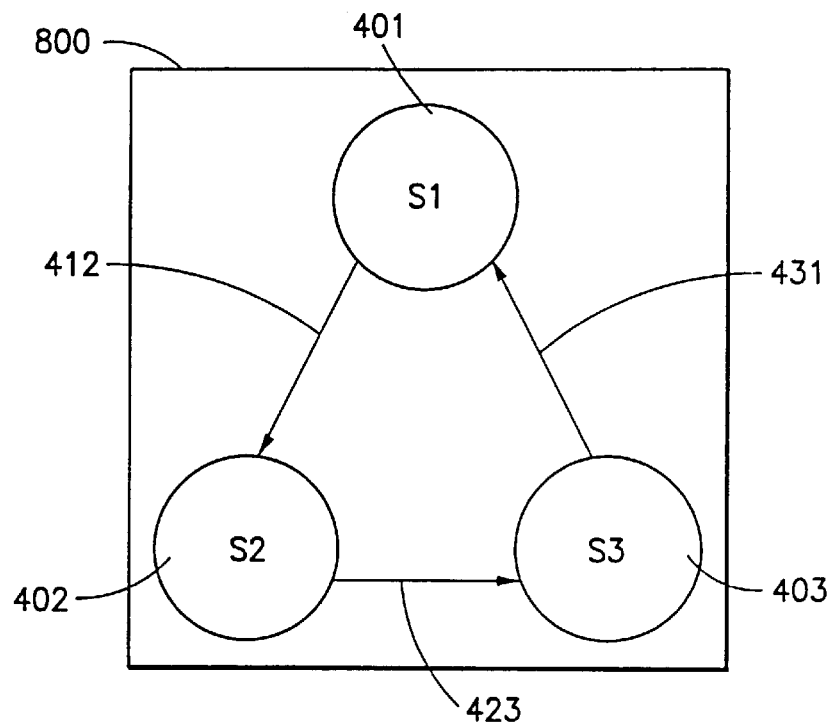
FIG. 8 shows a state diagram showing a three-state machine that allows three possible transitions between any two different states, such that any state is reachable from any other state.

In FIG. 8, three-state machine 800 has only three of the six state-to-state transitions of three-state machine 400. The three operative transitions are such that any state can be reached from another state by means of one or two transitions. Therefore each pair of states is connected by one and only one transition, in such a way that all transitions move either clockwise or anticlockwise. Three-state machine 800 represents a class of two possible three-state machines that have only three of the six state-to-state transitions. In the particular case of FIG. 8, the three operative transitions 412, 423 and 431 define an anticlockwise cycle.

All three-state machines relevant to this invention are listed in FIG. 9. The six state-to-state transitions 412, 421, 423, 432, 431 and 413 are named T12, T21, T23, T32, T31 and T13, respectively. Each row defines one possible three-state machine. For each state-to-state transition, the existence or not of that transition is indicated. The three-state machine defined by row 900 is a preferred embodiment that corresponds to three-state machine 400 of FIG. 4. The three-state machines defined by rows 901, 902, 903, 904, 905, and 906 belong to the class of three-state machine 500 of FIG. 5. The three-state machines defined by rows 907, 908, 909, 910, 911, and 912 belong to the class of three-state machine 600 of FIG. 6. The three-state machines defined by rows 913, 914, and 915 belong to the class of three-state machine 700 of FIG. 7. The three-state machines defined by rows 916 and 917 belong to the class of three-state machine 800 of FIG. 8.

Figure 10:
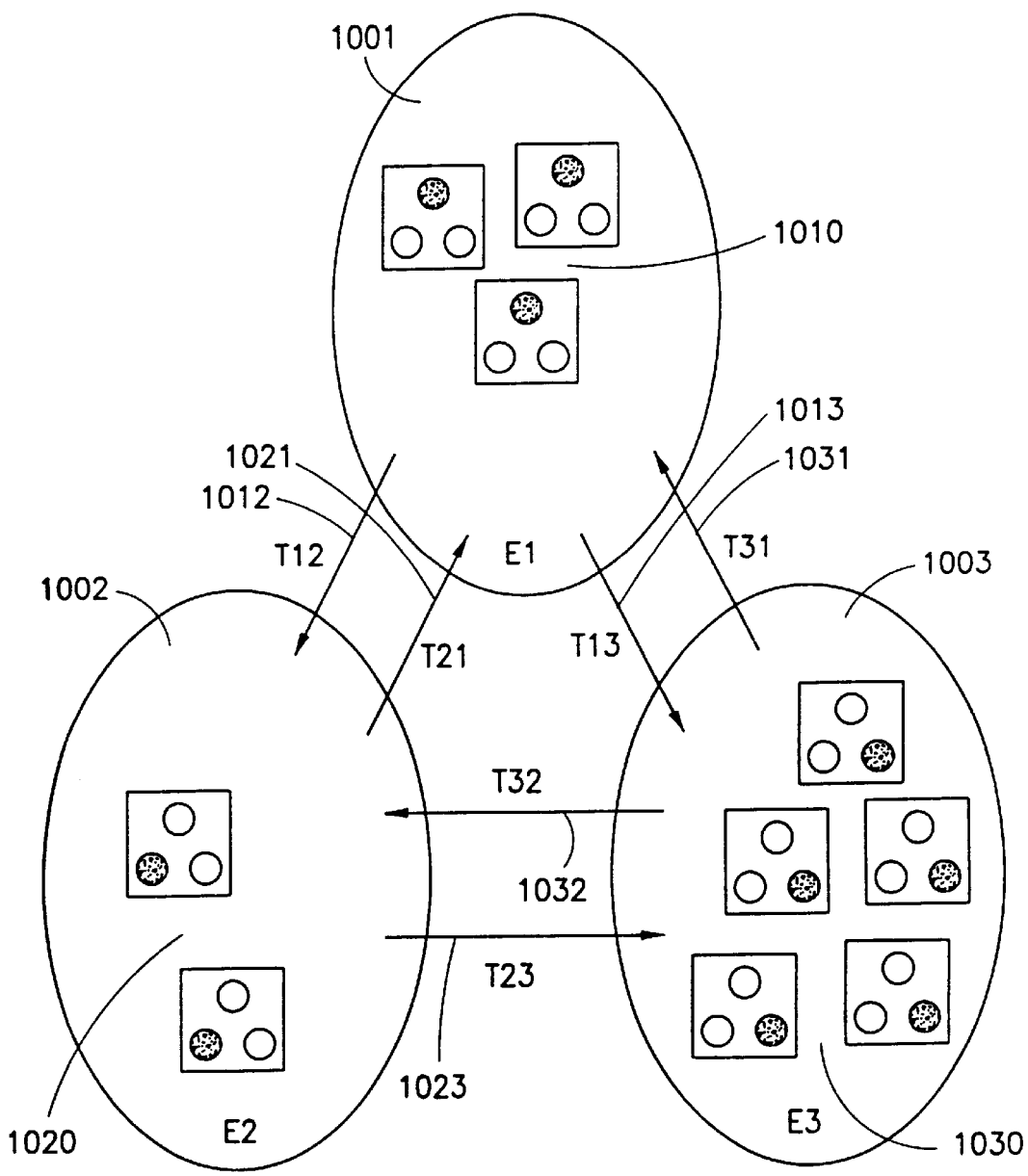
FIG. 10 is a set theoretic representation of how the plurality of slaves is subdivided into at most three sets.

At any one time, each slave is at one and only one of the three states 401, 402, or 403. Accordingly, there are three sets of slaves; those are state 401, those are state 402, and those at state 403. State transitions are equivalent to movement between those three sets. This view of operating over sets is illustrated in FIG. 10. Set 1001, named E1, contains as elements all slaves 1010 that are at state 401. Set 1002, named E2, contains as elements all slaves 1020 that are at state 402. Set 1003, named E3, contains as elements all slaves 1030 that are at state 403. There are six base commands, irrespective of the condition they specify, for effecting movement of elements between those three sets. Command 1012, named T12, moves elements from set 1001 to set 1002. Command 1021, named T21, moves elements from set 1002 to set 1001. Command 1023, named T23, moves elements from set 1002 to set 1003. Command 1032, named T32, moves elements from set 1003 to set 1002. Command 1031, named T31, moves elements from set 1003 to set 1001. Command 1013, named T13, moves elements from set 1001 to set 1003.

Figure 11:
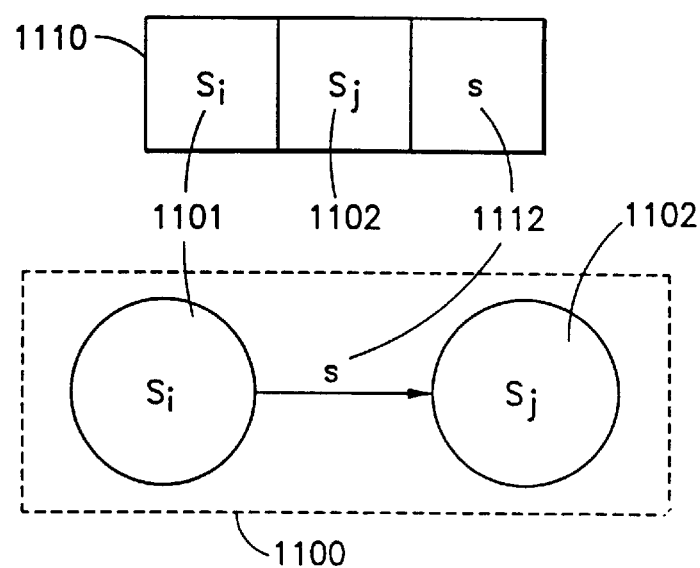
FIG. 11 describes what happens when a command to transfer slaves that satisfy some condition from one state to another is broadcast.

The simplest form of command is illustrated in FIG. 11. Command 1110 comprises three parameters. First, the "from" state 1101; second, the "to" state 1102; and third, the primitive condition 1112 which must be satisfied for the transition to happen. Those three parameters are named Si, Sj, and s, respectively in the figure. Si, the "from" state 1101, and Sj, the "to" state 1102, can be any of the three states 401, 402 or 403, except that Si and Sj are not equal.

The primitive condition may take many forms depending on the overall capabilities of the slaves and the purposes that underlie the need for selecting subsets of slaves. Such primitive conditions could take the form of equality testing or numerical comparisons. Even though a single command broadcast from the master to the slave can only specify a single primitive condition, arbitrarily complex conditions are realized by a sequence of these primitive commands. In a preferred embodiment, an arbitrarily complex condition is described by a logical equation over primitive conditions. For example, the complex condition A*B+~A*~B, where A and B are primitive conditions, "*" is the binary logical operator AND, "+" the binary logical operator OR, and "~" the unary logical operator NOT. Negated primitive conditions, such as ~A, are assumed to be primitive conditions.

It is convenient for expositional purposes to textually represent command 1110. A simple syntax used herein is to write the command as Tij(s), where i and j are 1, 2, or 3, corresponding to states 401, 402, 403, respectively, and s is the condition to be satisfied. The prefix T, for transition, is purely cosmetic. For example, T31(~A) represents a command to move all slaves that are at the third state and which do not satisfy A, to the first state, while T23(1) represents a command to move all slaves that are at the second state to the third state unconditionally.

The six possible transitions 412, 413, 421, 423, 431 and 432 for some condition s, can thus be written has T12(s), T13(s), T21(s), T23(s), T31(s) and T32(s), respectively. Any command thus involves only two of the three states of a three-state machine and only one of the six possible transitions. The pair of states 1100 in FIG. 11 and the single transition between them defines the scope of a single command. Only slaves that are at state Si, that is the "from" state 1101, of the pair of states 1100 are allowed to transition, and those that do transition will do it to state Sj, that is the "to" state 1102. Condition s is tested by each slave that is at state Si. Those for which the condition is satisfied will switch to state Sj. These semantics are expressed by the two logical expressions $Ei=Ei*{\sim}s$ $Ej=Ej+Ei*s$ The first expression states that the set Ei, of all slaves that are at state Si, is decremented by the number of slaves that move from Si to Sj. That is expressed in the form of a logical AND between the previous value of set Ei and the virtual set of all slaves in Ei that did not satisfy condition s. Concurrently, the second expression states that the set Ej, of all slaves that are at state Sj, is augmented by the number of slaves that have moved from Si to Sj. That is expressed in the form of a logical OR between the previous value of set Ej and the virtual set of all slaves in Ei that satisfy condition s, the latter expressed by a logical AND between the previous value of set Ei and the virtual set of all slaves in Ei that satisfy condition s.

Since a command 1110 is broadcast to all slaves and they receive and operate on it concurrently, the command is essentially an operation over sets. The command Tij(s) effectively moves elements from a set Ei, of all slaves at state Si, to a set Ej, of all slaves at state Sj. Therefore sets E1, E2 and E3 are associated to states S1, S2 and S3, respectively. Those two notions, sets and states, are for the purpose of this invention functionally equivalent. Reference herein to states S1, S2 and S3 imply sets E1, E2 and E3, and vice versa, respectively.

Figure 12:
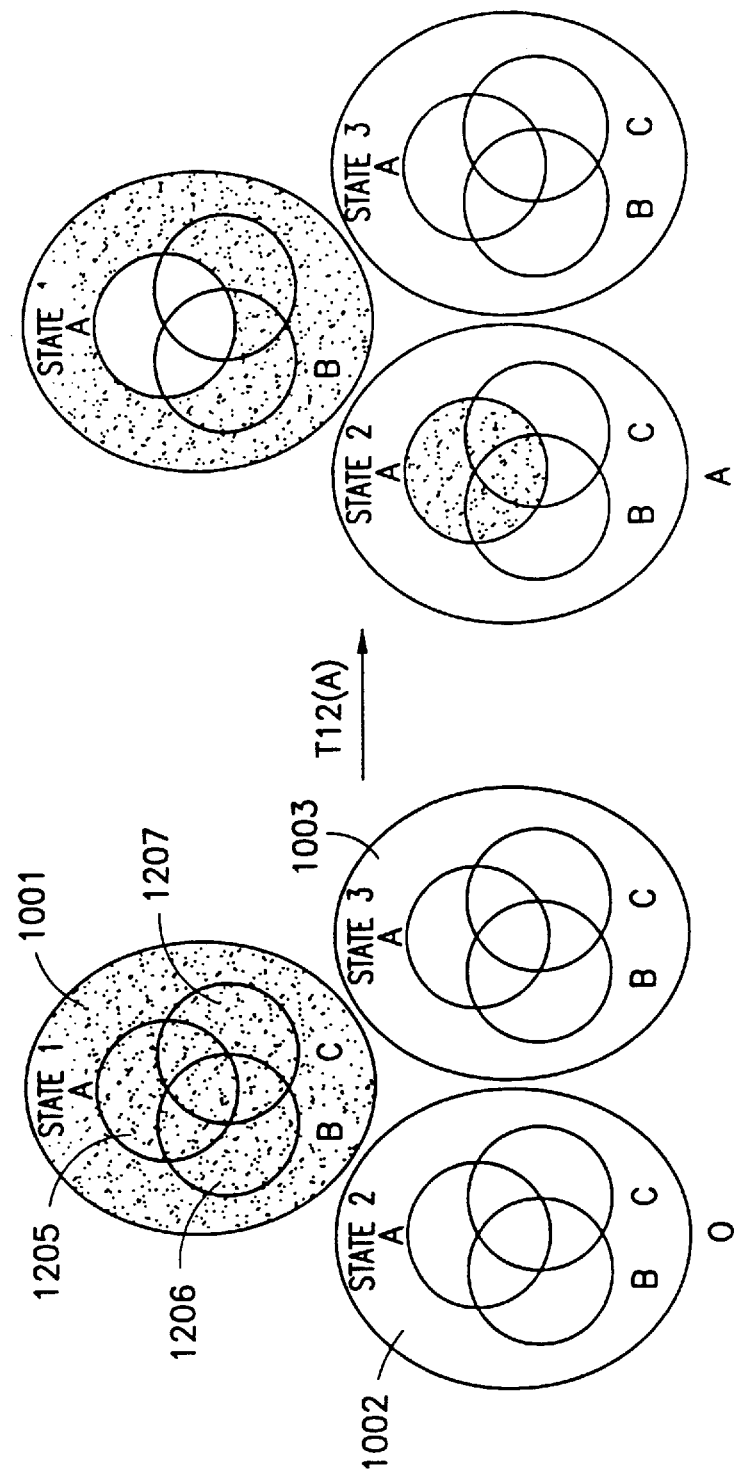
FIGS. 12, 13, 14, 15, 16 and 17 exemplifies by means of Venn diagrams how a command transfers elements from one set to another.

FIG. 12 illustrates by means of Venn diagrams a simple non limiting example of one of such command. Sets 1001, 1002 and 1003 correspond to slaves that are in the first, second and third state, respectively. For this example, set 1001 initially contains all slaves, while sets 1002 and 1003 are empty. Three testable primitive conditions A, B and C are defined. Each one of these three primitive conditions defines a virtual subset 1205, 1206 and 1207, respectively. The negation of each primitive condition, namely ~A, ~B and ~C, defines three complementary virtual subsets to 1205, 1206 and 1207, respectively. Those virtual subsets may or may not have slaves in common. In the figure we assume the most difficult case where virtual subsets 1205, 1206 and 1207 intersect each other. Command T12(A) is broadcast, which forces all slaves in virtual subset 1205 in set 1001 to move from set 1001 to set 1002. Therefore, after the command is executed by all slaves in this situation, the right half of the figure shows that set 1001 represents the ~A condition, set 1002, the A condition, and set 1003 is empty.

Note that other Figures in this disclosure that are Venn diagrams have there sets numbered in the same manner as FIG. 12 but that these number are not shown for clarity.

Figure 13:
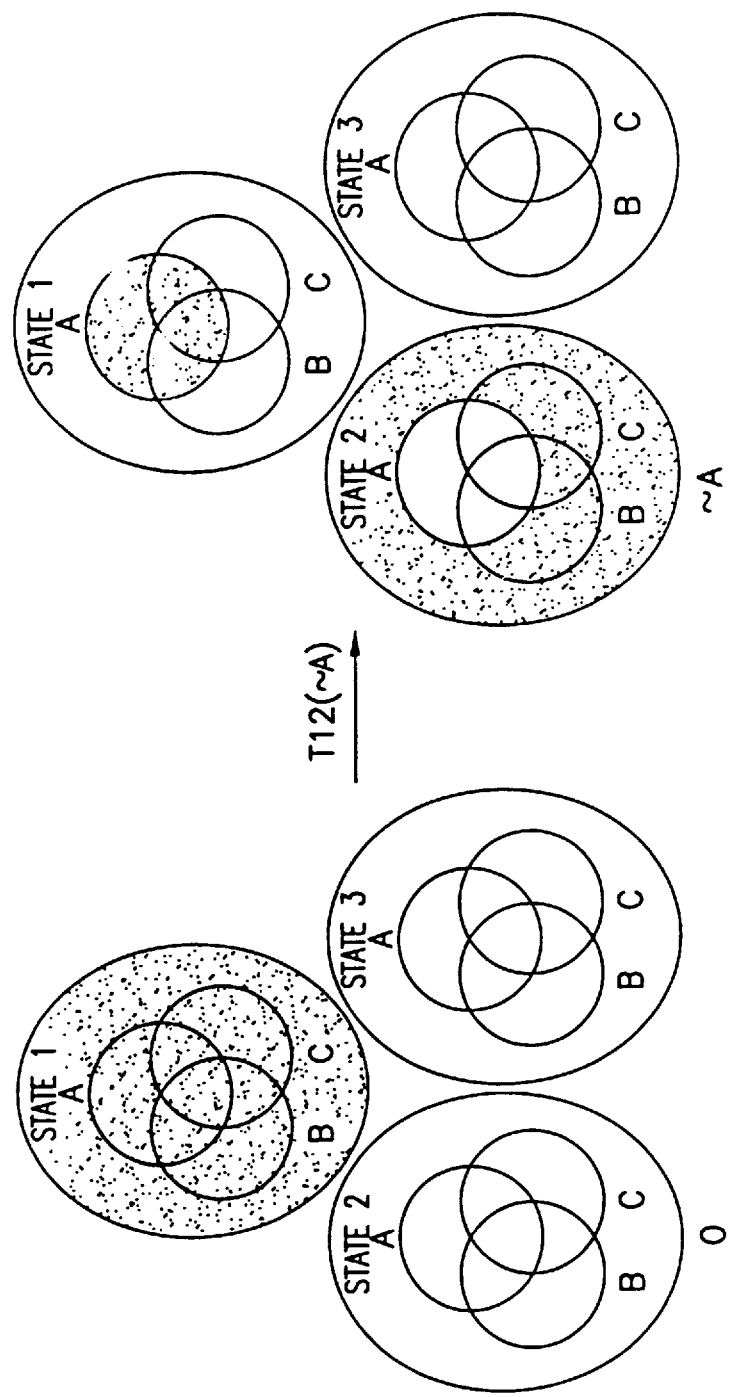

Another example is shown in FIG. 13. The starting configuration is the same as in FIG. 12. However, the command T12(~A) is broadcast instead. As the right half of the figure indicates, after the command is executed by all slaves in this situation, set 1001 represents the A condition, set 1002, the ~A condition, and set 1003 is empty.

Figure 14:
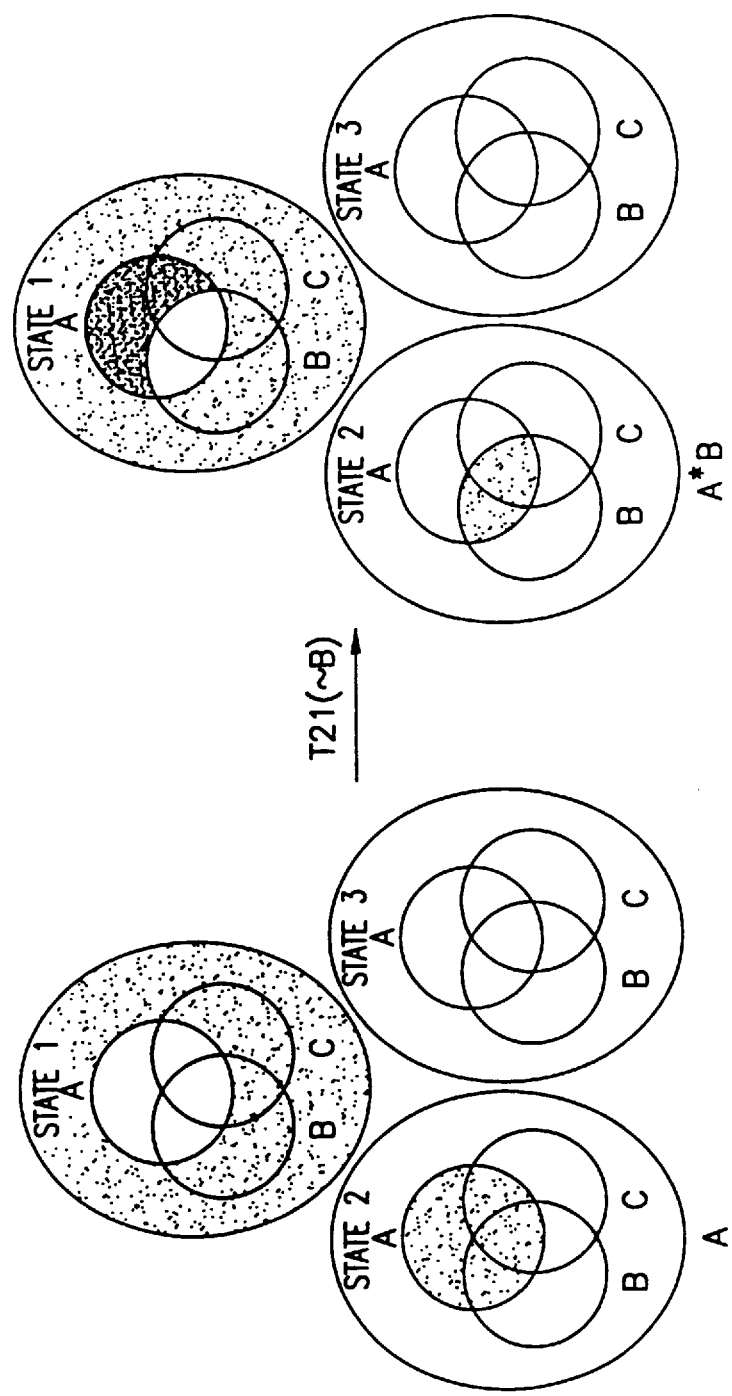

A condition that is the product of two or more primitive conditions is obtained by two or more commands. An AND condition A*B, for example, can be obtained by broadcasting two or more commands. First, T12(A), then T21(~B). Starting from the same initial configuration as used in FIG. 12, execution of T12(A) is shown in FIG. 12. Execution of command T21(~B) on that resulting configuration is shown in FIG. 14. As the right half of the figure indicates, after the two commands are executed in succession by all slaves in this situation, set 1001 represents the ~(A*B) condition, set 1002, the A*B condition, and set 1003 is empty. Therefore, set 1002 represents an AND condition, while set 1001 represents the complementary NAND condition.

Figure 15:
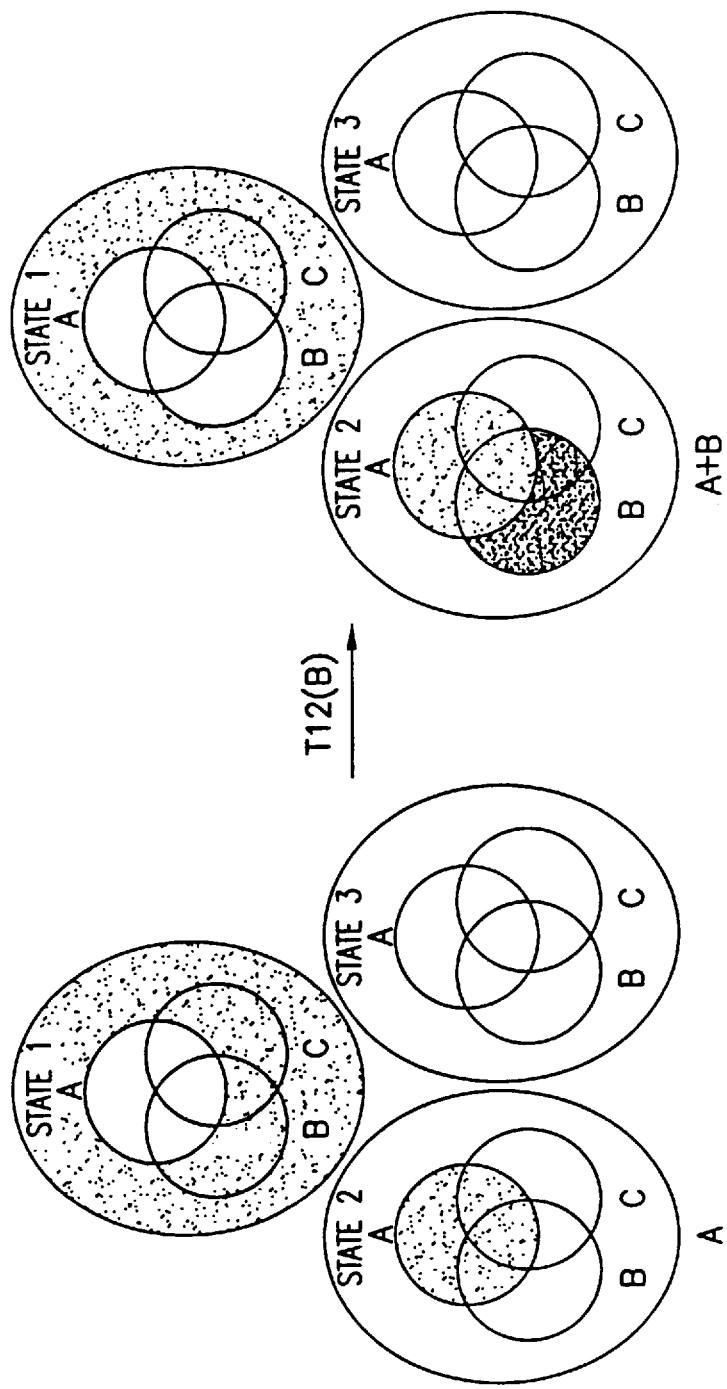

A condition that is the sum of two or more primitive conditions is obtained by two or more commands. An OR condition A+B, for example, can be obtained by broadcasting two commands. First, T12(A), then T12(B). Starting from the same initial configuration as used in FIG. 12, execution of T12(A) is shown in FIG. 12. Execution of command T12(B) on that resulting configuration is shown in FIG. 15. As the figure indicates, after the two commands are executed in succession by all slaves in this situation, set 1001 represents the ~(A+B) condition, set 1002, the A+B condition, and set 1003 is empty. Therefore, set 1002 represents an OR condition, while set 1001 represents the complementary NOR condition.

Figure 16:
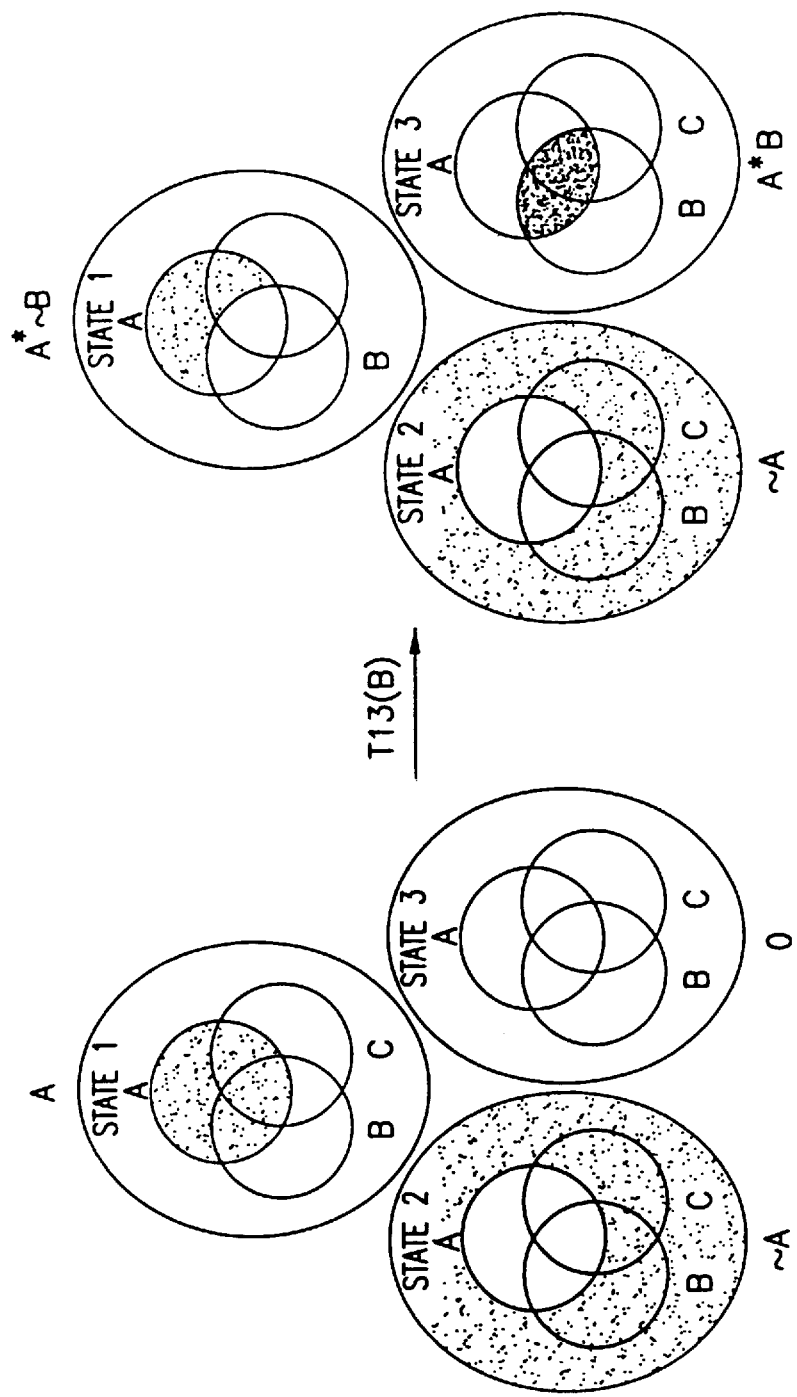
Figure 17:
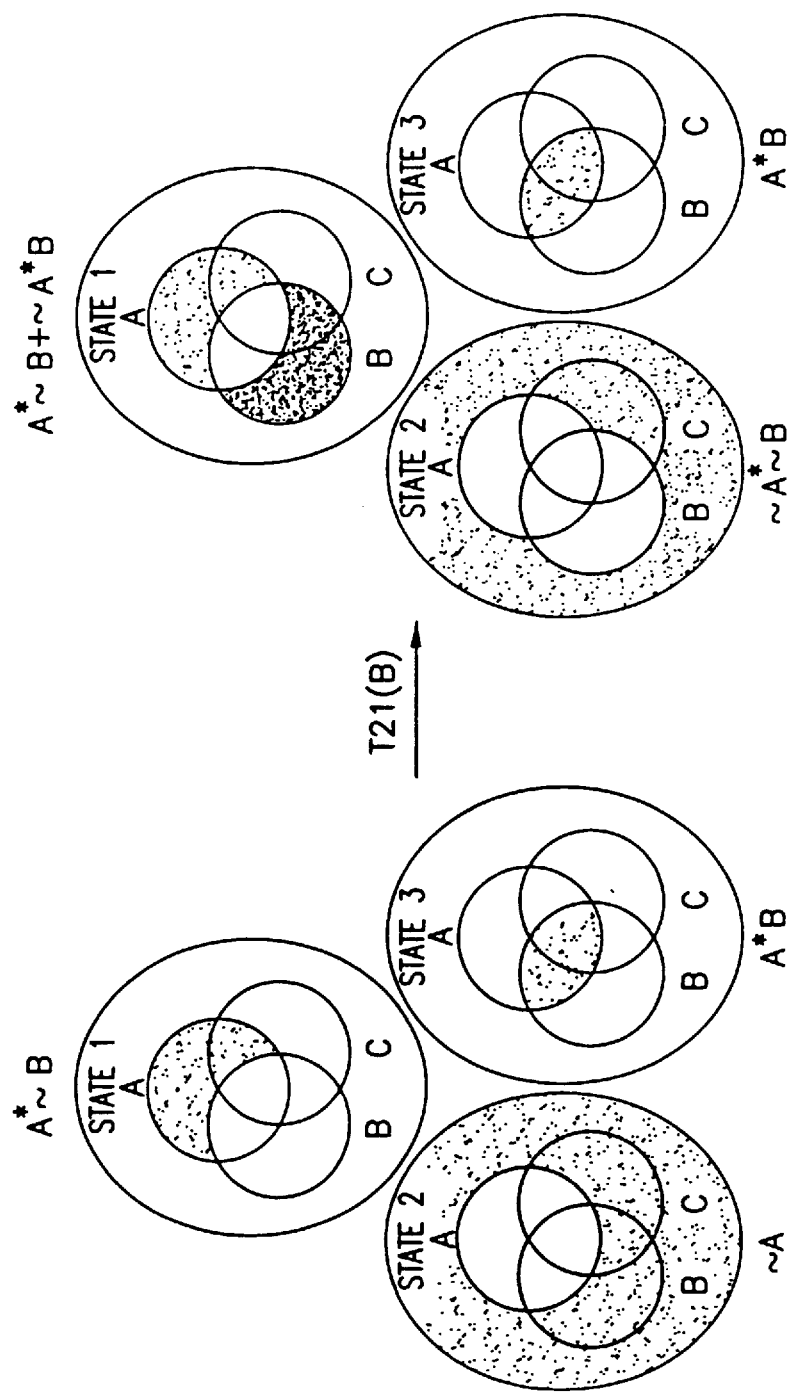

The previous two examples involve only two of the possible three sets. Some conditions require the use of all three sets. The only two conditions involving two primitive conditions A and B that require all three sets are the EXCLUSIVE-OR, A*~B+~A*B, and its complement the EQUIVALENCE, A*B+~A*~B. (See discussion of left nested expressions below.) The EXCLUSIVE-OR can be obtained by broadcasting a sequence of three commands. T12(~A), T13(B) and T21(B). Execution of the three commands is shown in FIGS. 13, 16, and 17. This sequence is more compactly represented in tabular form as done in FIG. 18. Row 1800 of the table is the initial state of the three sets. In this example, set 1001 has all slaves and sets 1002 and 1003 are empty. Rows 1801, 1802 and 1803 show the result of executing commands T12(~A), T13(B) and T21(B), respectively, and the resulting conditions expressed by each of the three sets after each command is executed. As FIG. 18 shows, after the three commands are executed in succession by all slaves in this situation, set 1001 represents the A*~B+~A*B condition, set 1002, the ~A*~B condition, and set 1003, the A*B condition. As is, the slaves that satisfy the EXCLUSIVE-OR condition ended up in set 1001. If the goal had been to place those slaves in set 1002 instead, a different sequence of commands would be broadcast. That sequence is shown in FIG. 19. Rows 1900, 1901, 1902 and 1903 of the table show the initial and succeeding conditions obtained in each set during the execution of the sequence of commands T12(A), T23(B) and T12(B). If the goal had been to place the EXCLUSIVE-OR in set 1003 instead, a different sequence of commands would be broadcast. That sequence is shown in FIG. 20. Rows 2000, 2001, 2002 and 2003 of the table show the initial and succeeding conditions obtained in each set during the execution of the sequence of commands T13(A), T32(B) and T13(B).

The present invention teaches several methods for generating a command sequence necessary to select slaves that satisfy an arbitrarily complex condition involving any number of primitive conditions. Before describing the most general methods, the invention first teaches a few important methods aimed at certain types of complex conditions. Non limiting examples of command sequences are given in the columns numbered 1810 (in FIG. 18), 1910 (in FIG. 19), 2010 (in FIG. 20), 2610 (in FIG. 26), 2710 (in FIG. 27), 2910 (in FIG. 29), 3010 (in FIG. 30), 3210 (in FIG. 32), 3310 (in FIG. 33), 3510 (in FIG. 35), 3610 (in FIG. 36), 3910 (in FIG. 39), and 4010 (in FIG. 40).

Each command, T, sent from the master to one or more slaves, has a single primitive condition, ci, that is one of any number of arbitrary primitive conditions. The command, T, addresses some information stored on each of the slaves and causes the respective slave to compare its stored information with the primitive condition.

Figure 21:
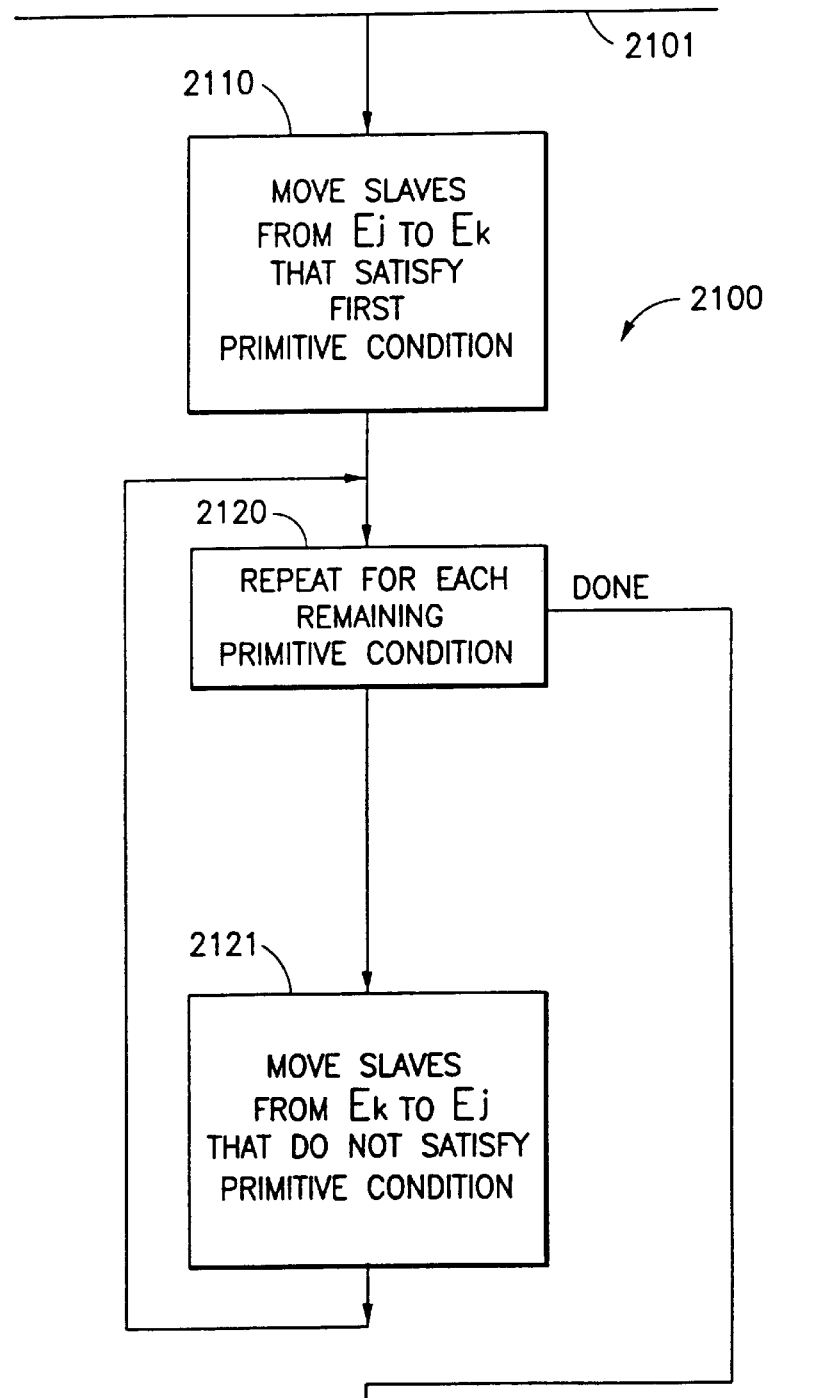

The first of those is a condition expressed by the product of two or more primitive conditions. This is the general AND condition and the method for handling that kind of condition is shown in FIG. 21. Method 2100 takes as input 2101 two different sets Ej and Ek of the possible three sets E1, E2 and E3, and an AND of N primitive conditions, that is c1*c2* . . . *cN. Method 2100 outputs a configuration 2102 whereby all slaves in set Ej that satisfied the aforementioned AND condition have moved to set Ek. If set Ek was not empty to start with, a side effect of the method is that all slaves originally in Ek that did not satisfy the reduced condition c2* . . . *cN have moved to set Ej. That can be represented mathematically as $$Ej=Ej*\sim(c1*c2* \ldots *cN)+Ek*\sim(c2*c3* \ldots *cN)$$

$$Ek=Ej*(c1*c2* \ldots *cN)+Ek*(c2*c3* \ldots *cN)$$

Method 2100 accomplishes this by generating a sequence of N commands. In step 2110, a command is issued that causes all slaves in set Ej that satisfy first primitive condition c1 to move to set Ek. This command is written as Tjk(c1). The state transitions effected can be mathematically represented as $$Ej=Ej*\sim C1$$

$$Ek=Ek+Ej*c1$$

Step 2120 controls the iteration over all remaining primitive conditions that make up the input AND condition 2101. For each primitive condition ci, where i varies from 2 to N, step 2121 issues a command that causes all slaves in set Ek that do not satisfy primitive condition ci to move to set Ej. This command is written as Tkj(~ci). The state transitions effected can be mathematically represented as $$Ej=Ej+Ek*\sim c1$$

$$Ek=Ek*c1$$

The iteration ends after the last primitive condition, cN, has been processed by step 2121. That terminates the method.

In a preferred embodiment, Ek begins as a null set so that the slaves that are found in Ek at the end of method 2100 are exactly those that satisfy the AND condition.

Figure 22:
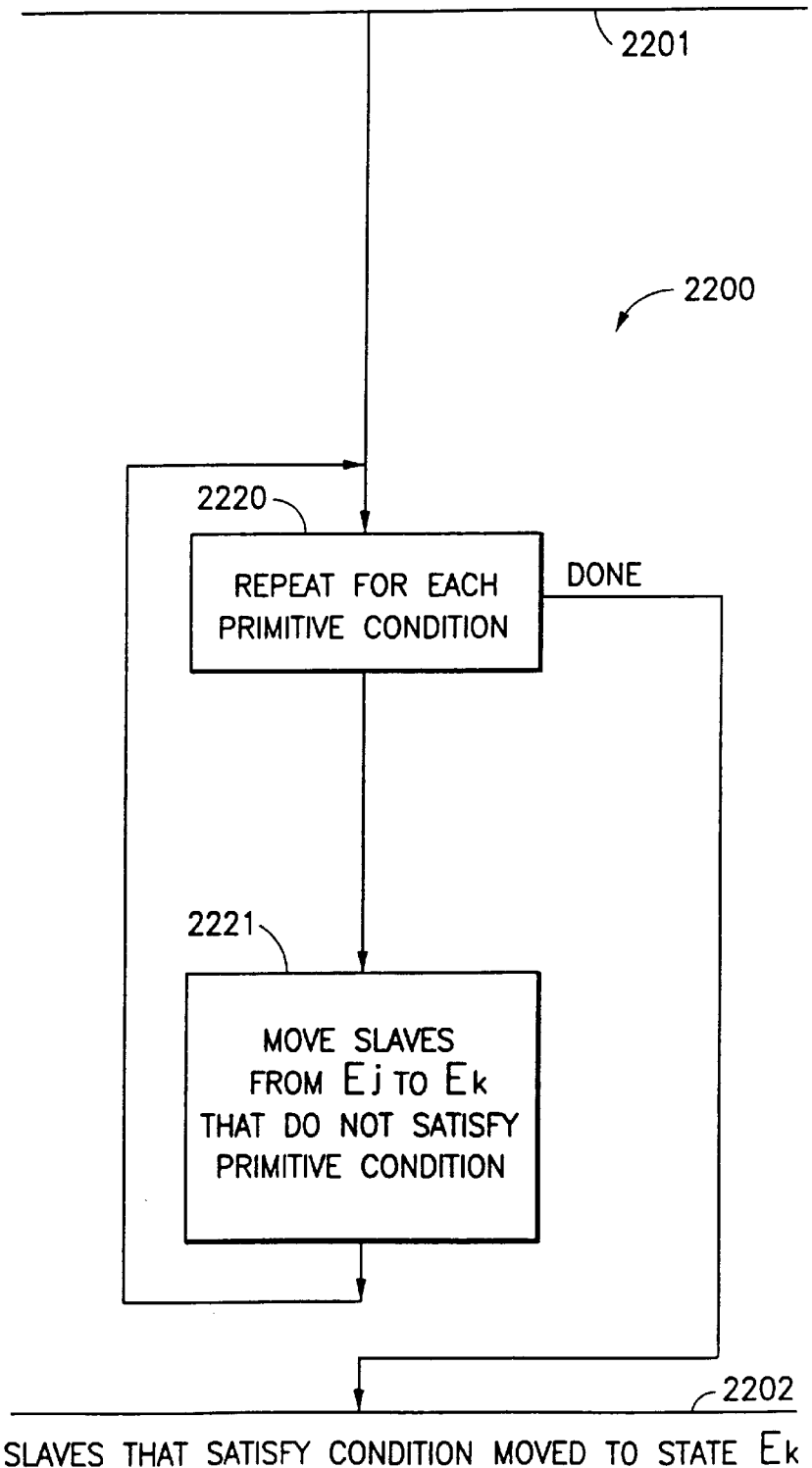
FIG. 22 describes a method that computes a negated product (NAND) condition.

The second is a condition expressed by the negation of a product of two or more primitive conditions. This is the general NAND condition and the method for handling that kind of condition is shown in FIG. 22. Method 2200 takes an input 2201 two different sets Ej and Ek of the possible three sets E1, E2 and E3, and a NAND of N primitive conditions, that is, ~(c1*c2* ... *cN). Method 2200 outputs a configuration 2202 whereby all slaves in set Ej that satisfy the aforementioned NAND condition are moved to set Ek. That can be represented mathematically as $$Ej=Ej*(c1*c2* \ldots *cN)$$

$$Ek=Ek+Ej*\sim(c1*c2* \ldots *cN)$$

Method 2200 accomplishes this by generating a sequence of N commands. The main step 2220 controls the iteration over all the primitive conditions that make up the input NAND condition. For each primitive condition ci, where i varies from 1 to N, step 2221 issues a command that causes all slaves in set Ej that do not satisfy primitive condition ci to move to set Ek. This command is written as Tjk(~ci). The state transitions effected can be mathematically represented as $$Ej=Ej*c1$$

$$Ek=Ek+Ej*\sim c1$$

The iteration ends after the last primitive condition, cN, has been processed by step 2221. That terminates the method.

In a preferred embodiment, Ek begins as a null set so that the slaves that are found in Ek at the end of method 2200 are exactly those that satisfy the NAND condition.

Figure 23:
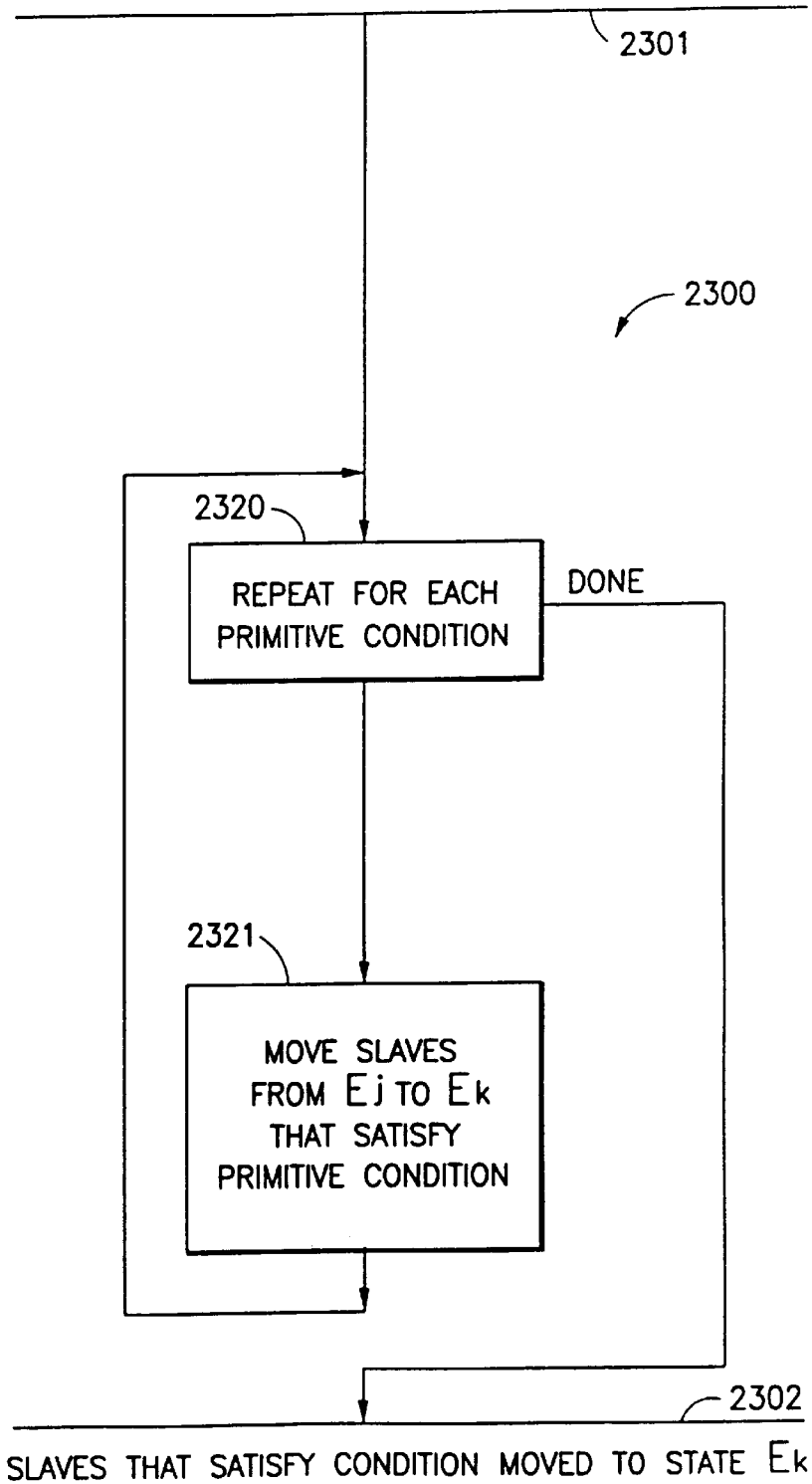
FIG. 23 describes a method that computes a sum (OR) condition.

The third is a condition expressed by the sum of two or more primitive conditions. This is the general OR condition and the method for handling that kind of condition is shown in FIG. 23. Method 2300 takes as input 2301 two different sets Ej and Ek of the possible three sets E1, E2 and E3, and an OR of N primitive conditions, that is, c1+c2+... +cN. Method 2300 outputs a configuration 2302 whereby all slaves in set Ej that satisfy the aforementioned OR condition are moved to set Ek. That can be represented mathematically as $$Ej=Ej*\sim(c1+c2+\ldots +cN)$$

$$Ej=Ek+Ej*(c1+c2+\ldots +cN)$$

Method 2300 accomplishes this by generating a sequence of N commands. The main step 2320 controls the iteration over all the primitive conditions that make up the input OR condition. For each primitive condition ci, where i varies from 1 to N, step 2321 issues a command that causes all slaves in set Ej that satisfy primitive condition ci to move to set Ek. This command is written as Tjk(ci). The state transitions effected can be mathematically represented as $$Ej=Ej*\sim c1$$

$$Ek=Ek+Ej*c1$$

The iteration ends after the last primitive condition, cN, has been processed by step 2321. That terminates the method.

In a preferred embodiment, Ek begins as a null set so that the slaves that are found in Ek at the end of method 2300 are exactly those that satisfy the OR condition.

Figure 24:
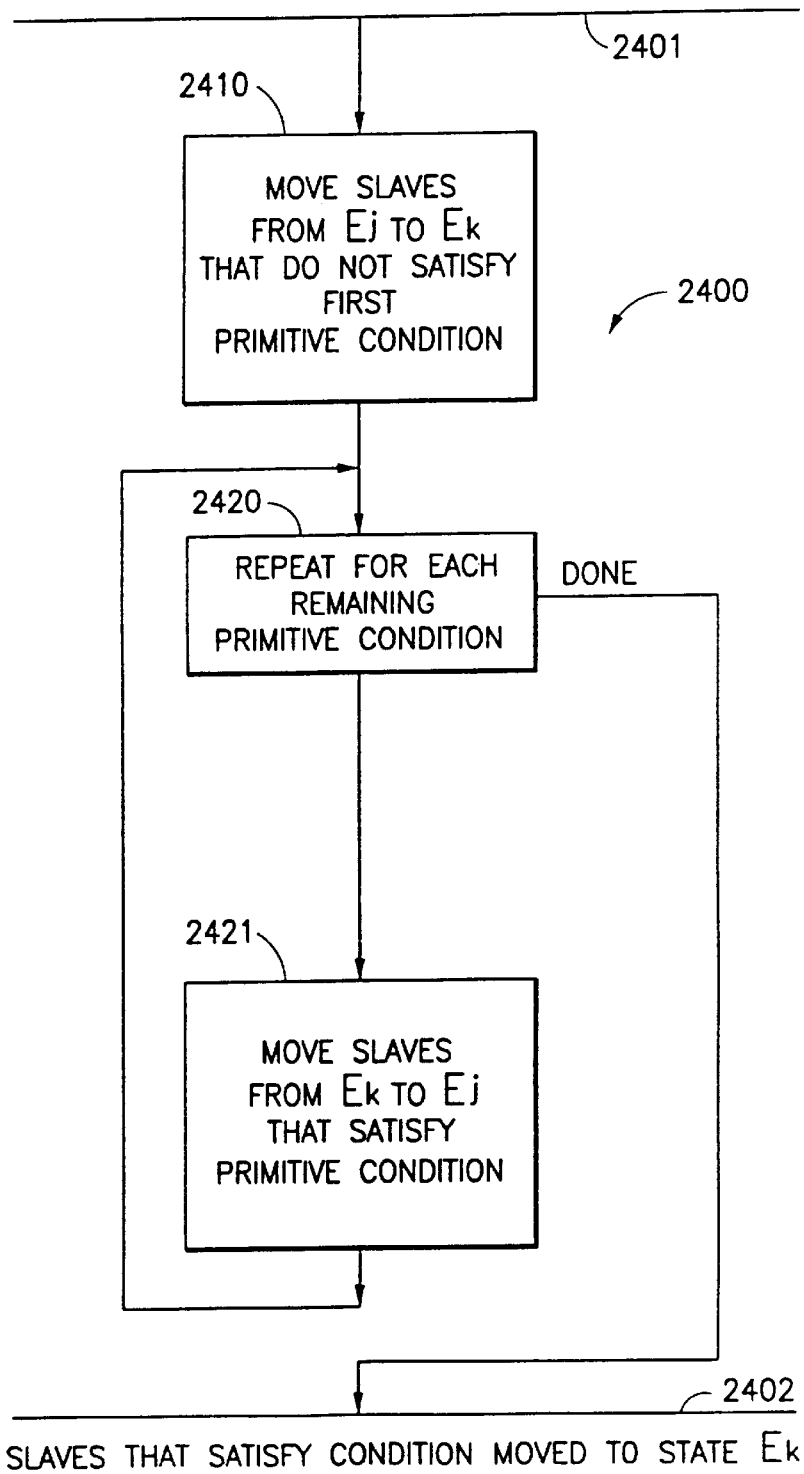
FIG. 24 describes a method that computes a negated sum (NOR) condition.

The fourth is a condition expressed by the negation of the sum of two or more primitive conditions. This is the general NOR condition and the method for handling that kind of condition is shown in FIG. 24. Method 2400 takes as input 2401 two different sets Ej and Ek of the possible three sets E1, E2 and E3, and a NOR of N primitive conditions, that is, ~(c1+c2+... +cN). Method 2400 outputs a configuration 2402 whereby all slaves in set Ej that satisfy the aforementioned NOR condition are moved to set Ek. If set Ek was not empty to start with, a side effect of the method is that all slaves originally in Ek that satisfied the reduced condition c2+... +cN have moved to set Ej. That can be represented mathematically as $$Ej=Ej*(c1+c2+\ldots +cN)+Ek*(c2+c3+\ldots +cN)$$

$$Ek=Ej*\sim(c1+c2+\ldots +cN)+Ek*\sim(c2+c3+\ldots +cN)$$

Method 2400 accomplishes this by generating a sequence of N commands. In step 2410, a command is issued that causes all slaves in set Ej that do not satisfy first primitive condition c1 to move to set Ek. This command is written as Tjk(~c1). The state transitions effected can be mathematically represented as $$Ej=Ej*c1$$

$$Ek=Ek+Ej*\sim c1$$

Step 2420 then controls the iteration over all the remaining primitive conditions that make up the input NOR condition. For each primitive condition ci, where i varies from 2 to N, step 2421 issues a command that causes all slaves in set Ek that satisfy primitive condition ci to move to set Ej. This command is written as Tkj(ci).

$$Ej=Ej+Ek*ci$$

$$Ek=Ek*\sim ci$$

The iterative step 2420 ends after the last primitive condition, cN, has been processed by step 2421. That terminates the method.

In a preferred embodiment, Ek begins as a null set so that the slaves that are found in Ek at the end of method 2400 are exactly those that satisfy the NOR condition.

Methods 2100, 2200, 2300 and 2400 can be combined to handle arbitrarily complex conditions. The simplest such combination is called canonical, because it is based on the well-known technique of expressing an arbitrarily complex condition in the form of sum-of-products, i.e., one or more ANDed primitive conditions that are ORed together. The canonical method works by computing each product term of the condition using two sets and accumulating, that is summing, the product terms into a third set.

Figure 25:
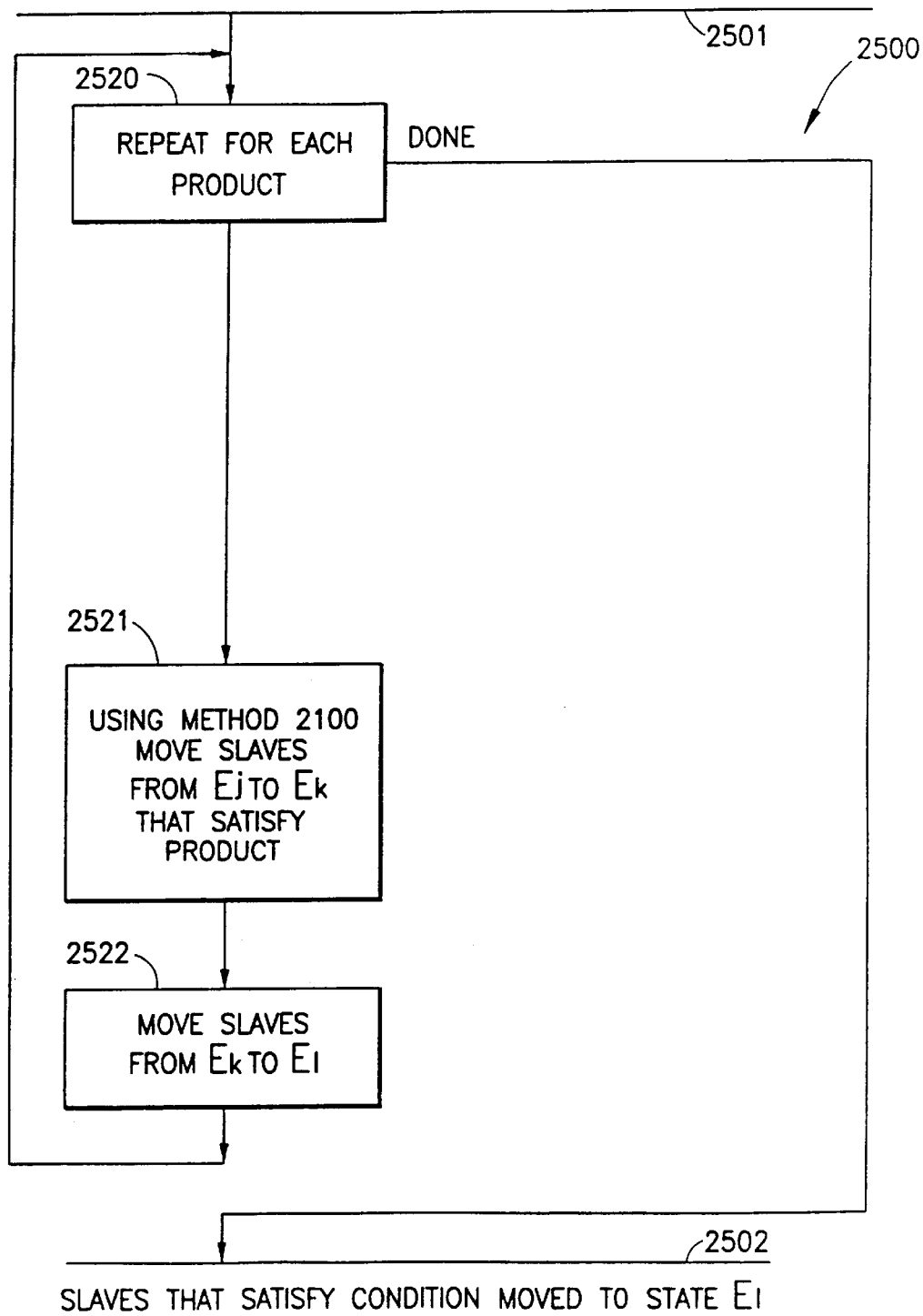
FIG. 25 describes a method that computes a condition written in sum-of-products form whereby the product terms are built in a second state and the sum is accumulated in a third state.

FIG. 25 shows a method 2500 that moves slaves from the first to the second state and visa versa. When slaves are in the second state, it is possible to move them to the third state where all remaining commands in the command sequence are ignored. Method 2500 takes as input 2501 three different sets Ej, Ek, and El, that is, some permutation of sets E1, E2 and E3, and a condition that is a sum of P product terms, that is, p1+p2+. . . +pP. Assuming, for simplicity, that set Ek is empty at the start of the method. Method 2500 outputs a configuration 2502 whereby all slaves in set Ej that satisfy the aforementioned sum-of-products condition are moved to set E1. That can be represented mathematically as $$Ej=Ej*\sim(p1+p2+\ldots+pP)$$

$$Ek=0$$

$$El=El+Ej*(p1+p2+\ldots+pP)$$

Method 2500 accomplishes this by generating a sequence of commands. The main step 2520 controls the iteration over all the product terms that make up the input sum-of-products condition 2501. For each product term pi, where i varies from 1 to P, first step 2421 issues a sequence of commands as defined by method 2100 that causes all slaves in set Ej that satisfy the product term pi to move to set Ek. Second step 2522 issues a command that causes all slaves in set Ek to move to set E1. The iteration ends after the last product term, pP, has been processed by steps 2521 and 2522. That terminates the method.

In other words, the method 2500 creates each of the product terms in 2521 and in set Ek. After each product term, pi, is created, it is ORed with the previously accumulated product terms in set E1. That frees up set Ek in preparation for the next product term.

Applying the method 2500 to the EXCLUSIVE-OR condition ~A*B+A*~B, for example, results in the command sequence 2610 shown in FIG. 26. The default initial configuration 2600 where all the slaves are in set E1 is used. In this example, j=1, k=2 and l=3. Commands T12(~A) and T21(~B), as per method 2100, are used to move slaves that satisfy the product term ~A*B from set E1 to set E2, as shown by rows 2601 and 2602. Command T23(1) sums that product term from E2 to E3, as shown in row 2603. That is the basic cycle for one product term. Next, commands T12(A), T21(B) and T23(1) repeat the cycle to move slaves that satisfy the next product term A*~B first from set E1 to set E2 and second from set E2 to set E3, as shown by rows 2604, 2605 and 2606. Six commands are generated by method 2500 for the EXCLUSIVE-OR condition, two of those on account of two product terms and the other four on account of four primitive conditions present over all product terms. Contrast this with the three commands generated by any the hand crafted solution of FIGS. 18, 19 and 20. While the canonical method is easy to compute, the command sequences it generates are not minimal in general.

An arbitrarily complex condition can be written in the form of a sum-of-products. A canonical method for generating a command sequence for a sum-of-products is to use first and second states to calculate product terms and to use the third state to accumulate the product terms. The canonical method does not yield the shortest command sequence but is easy to compute.

When a complex condition is put in sum-of-product form, the products do not have to be expanded so that each contains all primitive conditions used in the complex condition. For an example which includes three primitive conditions A, B, and C, the complex condition A*~B*C+ A*B*C+~A*B*C+A*B*C can be minimized to A*C+B*C and still be considered a sum-of-products for the purpose of method 2500 and other methods described hereunder. Such a minimization represents a significant reduction in commands required. While the fully expanded condition above would require sixteen commands (four product terms and twelve primitive condition appearances), the corresponding minimized sum-of-products requires six commands (two product terms and four primitive condition appearances), when both the command sequences are generated through the canonical method 2500. The six commands solution 2710 is shown in FIG. 27 and not surprisingly mimics the command sequence 2610 of FIG. 26. Again a default initial configuration 2700 where all slaves are in set E1 is used. In this example, j=1, k=2 and l=3. Command T12(A) transfers from set E1 to set E2 the slaves in set E1 that satisfy primitive condition A. Row 2701 indicates that set E1 contains the slaves that satisfy condition ~A; set E2, condition A; and set E3 is empty. Command T21(~C) transfers from set E2 to set E1 the slaves in set E2 that do not satisfy primitive condition C. Row 2702 indicates that set E1 represents condition ~A+A*~C, which is equivalent to ~A+~C; set E2, condition A*C; and set E3 is empty. Command T23(l) transfers from set E2 to set E3 all slaves in set E2. Row 2703 indicates the accumulation of product term A*C into set E3. Command T12(B) transfers from set E1 to set E23 the slaves in set E1 that satisfy primitive condition B. Row 2704 indicates that set E1 represents the condition (~A+~C)*~B, which is equivalent to condition ~A*~B+~B*~C; and set E2, condition (~A+~C)*B, which is equivalent to ~A*B+B*~C. Command T21 (~C) transfers from set E2 to set E1 the slaves in set E2 that do not satisfy primitive condition C. Row 2705 indicates that set E1 represents condition ~A*~B+~B*~C+(~A*B+B*~C)*~C, which reduces to ~A*~B+~B*~C+~A*B*~C+B*~C, then to ~A*~B+~B*~C+B*~C, then to ~A*~B+~C; and set E2 represents condition (~A*B+B*~C)*C, which is equivalent to ~A*B*C. Command T23(1) transfers from set E2 to set E3 all slaves in set E2. Row 2706 indicates that set E3 represents the condition A*C+~A*B*C, which reduces to (A+~A*B)*C, then to (A+B)*C, then to A*C+B*C, which is the sum-of-product condition that needed to be satisfied. Applying method 2500 to a minimized sum-of-products, as in this example, will generate a command sequence that is certainly shorter than a full-expanded sum-of-products, but is still not necessarily minimal.

Characteristic of method 2500 is that the first set Ej serves as the main repository of slaves and will end up containing the slaves originally in set Ej that do not satisfy the sum-of-products condition. Second set Ek serves to build each product term. Third set El serves to sum the product terms and will end up containing the slaves originally in set Ej that satisfy the sum-of-products condition. Therefore, for method 2500, each of the three sets has a uniquely defined role.

Figure 28:
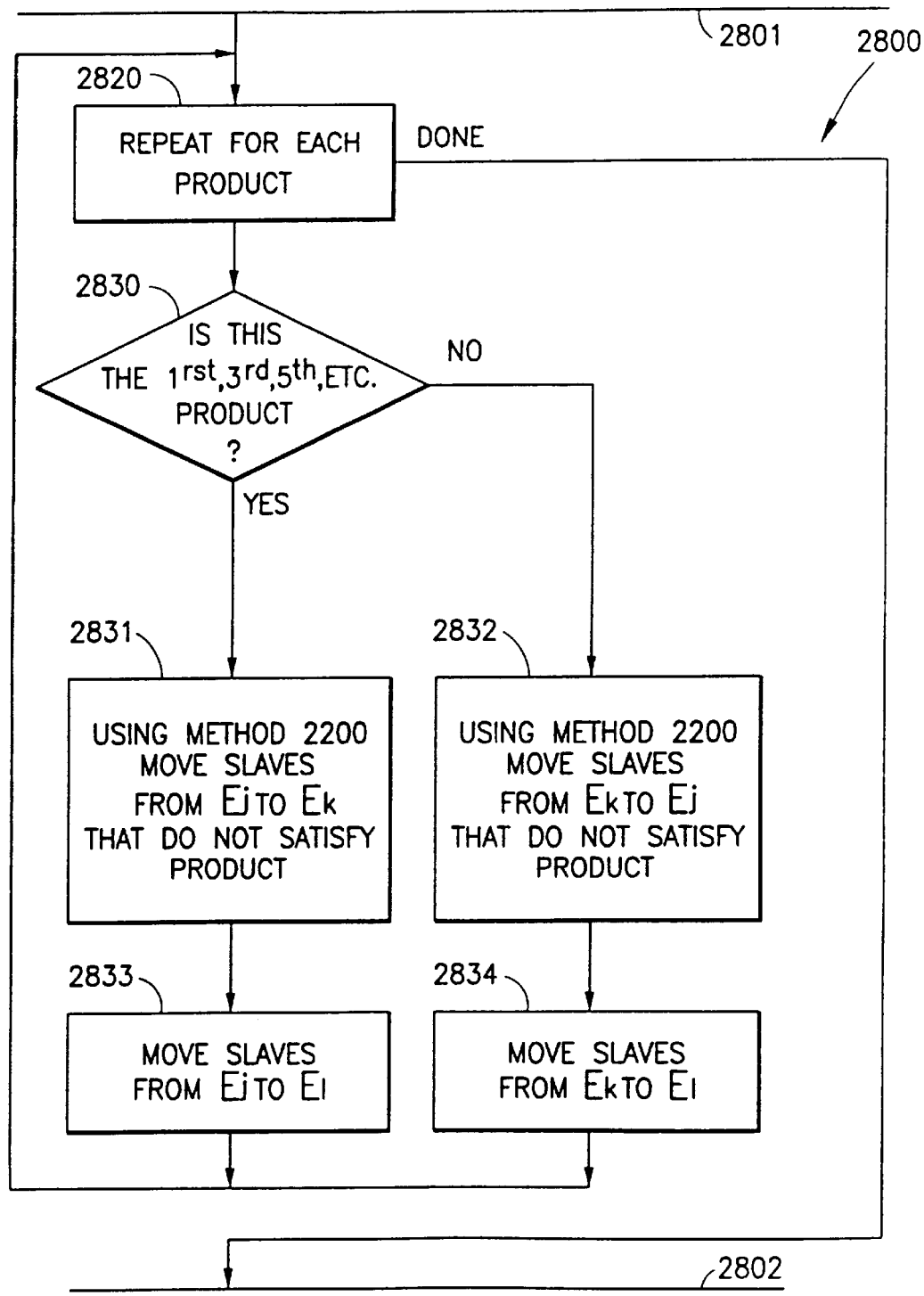
FIG. 28 describes a method that computes a condition written in sum-of-products form whereby the product terms are built alternatively in a first and second states and the sum is accumulated in a third state.

This does not need to be the case and one can create variations of method 2500 where the roles alternate. The method shown in FIG. 28 is one such variation. Method 2800 differs from method 2500 in that the roles of states Ej (state 1) and Ek (state 2) alternate, i.e. states 1 and 2 reverse roles. Product terms are build alternatively in states Ek and Ej: first in Ek, then in Ej, then back in Ek, and so on; in other words, odd product terms—first, third, fifth, etc.—are built in set Ek, while even product terms—second, fourth, sixth, etc.—are built in set Ej. Method 2800 is similar to method 2500 in that the role of state El remains the same. Method 2800 takes as input 2801 the same input as does method 2500. Method 2800 takes as input 2801 the same input as does method 2500. Method 2800 outputs a configuration whereby all slaves in Ej that satisfy the sum-of-products condition are moved to set El, and either set Ej or Ek will be empty depending on the number of product terms. If the condition has an even number of product terms, Ek will be empty; otherwise, Ej will be empty. That can be represented mathematically as $El=El+Ej*(p1+p2+\ldots+pP)$ (if P is even) $Ej=Ej*\sim(p1+p2+\ldots+pP)$ (if P is odd) $Ej=0$ (if P is even) $Ek=0$ (if P is odd) $Ek=Ej*\sim(p1+p2+\ldots+pP)$ The main step 2820 controls the iteration over all the product terms that make up the sum-of-products condition 2801. For each product term pi, where i varies from 1 to P, step 2830 tests whether i is odd or even. If i is odd, steps 2831 and 2833 are executed for product term pi. If i is even, steps 2832 and 2834 are executed for product term pi. Step 2831 issues a sequences of commands defined by NAND method 2200 that causes all slaves in set Ej that do not satisfy product term pi to move to set Ek. Step 2833 issues a command that causes all slaves in set Ej to move to set El. Similarly, step 2832 issues a sequence of commands defined by NAND method 2200 that causes all slaves in set Ek that do not satisfy product term pi to move to set Ej. Step 2834 issues a command that causes all slaves in set Ek to move to set El. The iteration ends after the last product term, pP, has been processed by either steps 2831 and 2833 (odd P case), or steps 2832 and 2834 (even P case). That terminates the method.

If method 2800 is used on the EXCLUSIVE-OR condition ~A*B+A*~B, the sequence of commands 2910 shown in FIG. 29 results. The default initial configuration 2900 where all slaves are in set El is used. In this example, j=1, k=2 and l=3. Rows 2901 and 2902 correspond to the application of method 2200 from E1 to E2 to the product term ~A*B. Row 2903 is the accumulation of that product term in E3. Rows 2904 and 2905 correspond to the application of method 2200 from E2 to E1 to the product term A*~B. Row 2906 is the accumulation of that product term in E3. Because the number of product term is even in this case, E2 is empty at the end.

A similar sequence of commands results if method 2800 is used on the condition A*C+B*C. The sequence of commands 3010 is shown in FIG. 30. The default initial configuration 3000 where all slaves are in set El is used. In this example, j=1, k=2 and l=3. Rows 3001 and 3002 correspond to the application of method 2200 from E1 to E2 to the product term A*C. Row 3003 is the accumulation of that product term in E3. Rows 3004 and 3005 correspond to the application of method 2200 from E2 to E1 to the product term B*C. Row 3006 is the accumulation of that product term in E3. Because the number of product term is even in this case, E2 is empty at the end.

Figure 31:
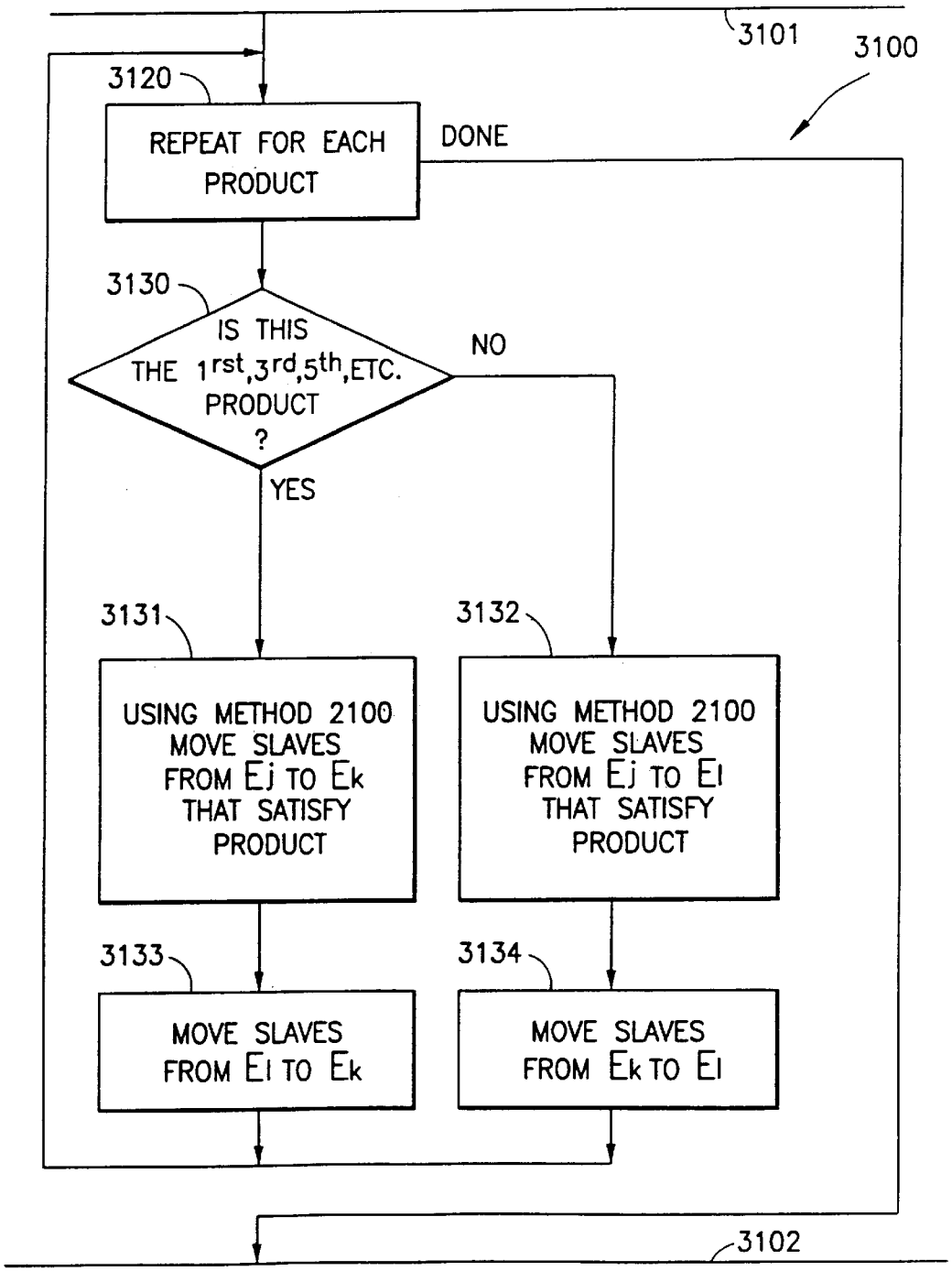
FIG. 31 describes a method that computes a condition written in sum-of-products form whereby the product terms are built alternatively in a second and third states and the sum is accumulated in that second and third state, respectively.

The method shown in FIG. 31 differs from methods 2500 and 2800 in that both the building of product terms and the accumulation of product terms alternates between two sets. Specifically, the roles of set Ek (state 2) and El (state 3) reverse. With method 3100 product terms are either computed from set Ej to set Ek or from set Ej to set El. While for methods 2500 and 2800 summing was done by adding the latest product term into the previous accumulation, with method 3100 the previous accumulation is added to the latest product term. Accordingly, when the latest product term is built in set Ek, accumulation is from El to Ek, and when the latest product term is built in set El, accumulation is from Ek to El. Method 3100 takes as input 3101 the same input as do methods 2500 and 2800. Method 3100 outputs a configuration whereby all slaves in Ej that satisfy the sum-of-products condition are moved to either set Ek or El depending on the number of product terms. If the condition has an even number of product terms, El will contains the desired slaves; otherwise, Ek will. That can be represented mathematically as $Ej=Ej*\sim(p1+p2+\ldots+pP)$ (if P is odd) $Ek=El+Ej*(p1+p2+\ldots+pP)$ (if P is even) $Ek=0$ (if P is odd) $El=0$ (if P is even) $El=El+Ej*(p1+p2+\ldots+pP)$ The main step 3120 controls the iteration over all the product terms that make up the sum-of-products condition 3101. For each product term pi, where i varies from 1 to P, step 3130 tests whether i is odd or even. If i is odd, steps 3131 and 3133 are executed for product term pi. If i is even, steps 3132 and 3134 are executed for product term pi. Step 3131 issues a sequence of commands defined by AND method 2100 that causes all slaves in set Ej that satisfy product term pi to move to set Ek. Step 3133 issues a command that causes all slaves in set El to move to set Ek. Similarly, step 3132 issues a sequence of commands defined by AND method 2100 that causes all slaves in set Ej that satisfy product term pi to move to set El. Step 3134 issues a command that causes all slaves in set Ek to move to set El. The iterative step 3120 ends after the last product term, pP, has been processed by either steps 3131 and 3133 (odd P case), or steps 3132 and 3134 (even P case). That terminates the method.

If method 3100 is used on the EXCLUSIVE-OR condition ~A*B+A*~B, the sequence of commands 3210 shown in FIG. 32 results. The default initial configuration 3200 where all slaves are in set El is used. In this example j=1, k=2, and l=3. Rows 3201 and 3202 correspond to the application of method 2100 from E1 to E2 to the product term ~A*B. Row 3203 is the accumulation of E3 into that product term. Because E3 is empty, this command is unnecessary but is included as part of the normal cycle. Rows 3204 and 3205 correspond to the application of method 2100 from E1 to E3 to the product term A*~B. Row 3206 is the accumulation of E2 into that product term. Because the number of product term is even in this case, E3 contains the desired set of slaves.

A similar sequence of commands results if method 3100 is used on the condition A*C+B*C. The sequence of commands 3310 is shown in FIG. 33. The default initial configuration 3300 where all slaves are in set El is used. In this example, j=1, k=2 and l=3. Rows 3301 and 3302 correspond to the application of method 2100 from E1 to E2 to the product term A*C. Row 3303 is the accumulation of E3 into that product term. Because E3 is empty, this command is unnecessary but is included as part of the normal cycle. Rows 3304 and 3305 correspond to the application of method 2100 from E1 to E3 to the product term B*C. Row 3306 is the accumulation of E2 into that product term. Because the number of product term is even in this case, E3 contains the desired set of slaves.

Figure 34B:
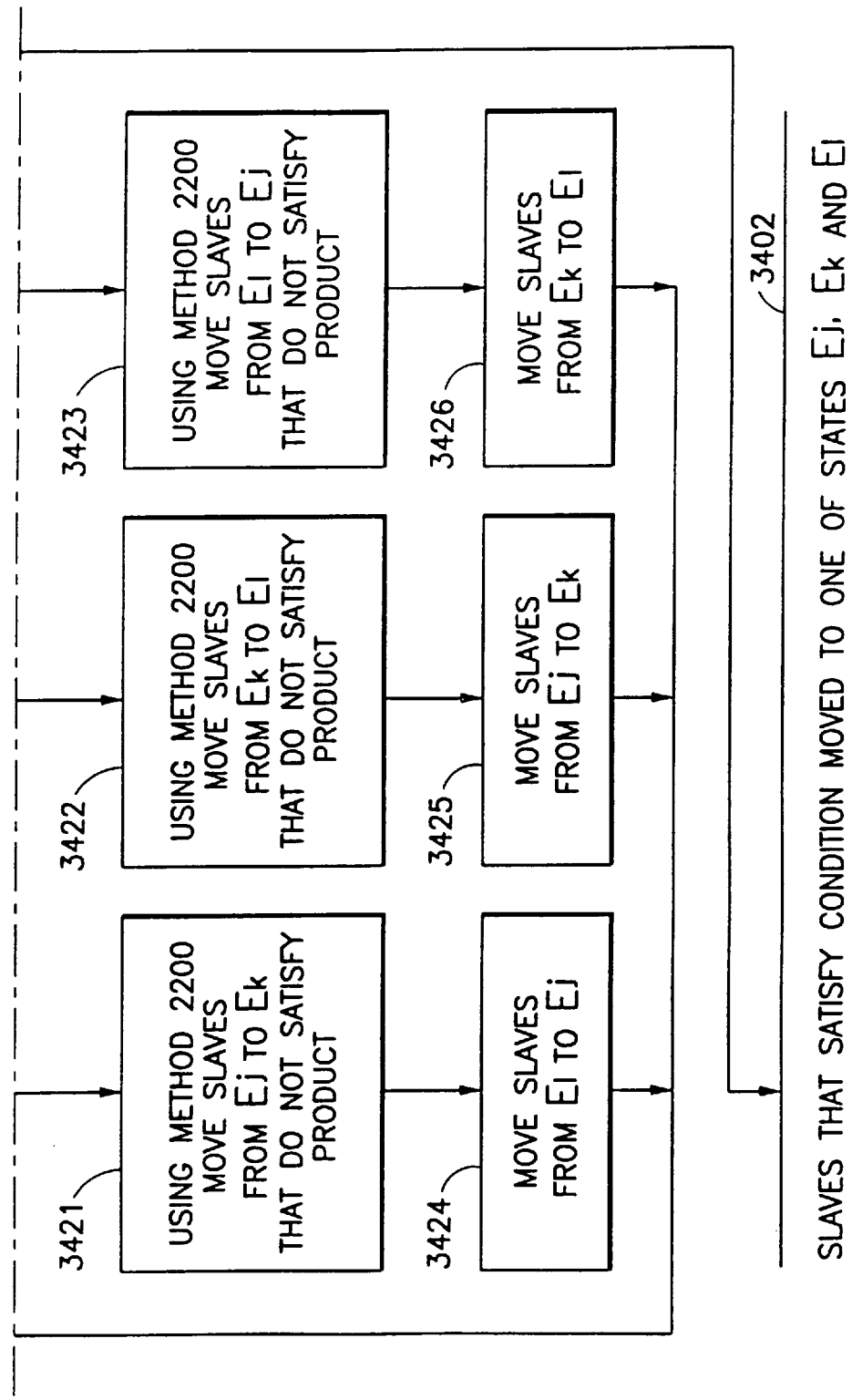
FIG. 34 describes a method that computes a condition written in sum-of-products form whereby the product terms are built alternatively in a first, second and third states and the sum is accumulated in that first, second and third state, respectively.

The method shown in FIG. 34 differs from methods 2500, 2800 and 3100 in that the building of product terms and the accumulation of those products terms rotates among three sets, i.e., the states cycle roles. Method 3400 takes as input 3401 the same input as do methods 2500, 2800 and 3100. Method 3400 outputs a configuration whereby all slaves in set Ej that satisfy the sum-of-products condition are moved to set Ej, Ek or El depending on the number of product terms. If the number of product terms modulo 3 is one, that is, 1, 4, 7, etc., set Ej will end up containing the desired set of slaves. If the number of product terms modulo 3 is two, that is 2, 5, 8, etc., set Ek will end up containing the desired set of slaves. If the number of product terms modulo 3 is zero, that is, 3, 6, 9, etc., set El will end up containing the desired set of slaves. That can be represented mathematically as (if (P mod 3)=1) $Ej=El+p1+p2+\ldots+pP$, $El=0$ (if (P mod 3)=2) $Ek=El+p1+p2+\ldots+pP$, $Ej=0$ (if (P mod 3)=0) $El=El+p1+p2+\ldots+pP$, $Ek=0$ The main step 3410 controls the iteration over all product terms that make up the sum-of-products condition 3401. For each product term pi, where i varies from 1 to P, step 3420 tests whether i mod 3 is one, two or zero. If one, steps 3421 and 3424 are executed for product term pi. If two, steps 3422 and 3425 are executed for product term pi. If zero, steps 3423 and 3426 are executed for product term pi. Step 3421 issues a sequence of commands defined by NAND method 2200 that causes all slaves in set Ej that do not satisfy product term pi to move to set Ek. Step 3424 issues a command that causes all slaves in set El to move to set Ej. Similarly, step 3422 issues a sequence of commands defined by NAND method 2200 that causes all slaves in set Ek that do not satisfy product term pi to move to set El. Step 3425 issues a command that causes all slaves in set Ej to move to set Ek. Similarly, step 3423 issues a sequence of commands defined by NAND method 2200 that causes all slaves in set El that do not satisfy product term pi to move to set Ej. Step 3426 issues a command that causes all slaves in set Ek to move to set El. The iterative step 3410 ends after the last product term, pP, has been processed. That terminates the method.

If method 3400 is used on the EXCLUSIVE-OR condition ~A*B+A*~B, the sequence of commands 3510 shown in FIG. 35 results. The default initial configuration 3500 where all slaves are in set El is used. In this example j=1, k=2 and l=3. Rows 3501 and 3502 correspond to the application of method 2200 from E1 to E2 to the negated product term ~(~A*B). Row 3503 is the accumulation of E3 into E1. Because E3 is empty, this command is unnecessary but is included as part of the normal cycle. Rows 3504 and 3505 correspond to the application of method 2200 from E2 to E3 to the negated product term ~A*~B). Row 3506 is the accumulation of E1 into E2. Because the number of product terms modulo three is two in this case, E2 contains the desired set of slaves.

A similar sequence of commands results if method 3500 is used on the condition A*C+B*C. The sequence of commands 3610 is shown in FIG. 36. The default initial configuration 3600 where all slaves are in set E1 is used. In this example, j=1, k=2 and l=3. Rows 3601 and 3602 correspond to the application of method 2200 from E1 to E2 to the negated product term ~(A*C). Row 3603 is the accumulation of E3 into E1. Because E3 is empty, this command is unnecessary but is included as part of the normal cycle. Rows 3604 and 3605 correspond to the application of method 2200 from E2 to E3 to the negated product term ~(B*C). Row 3606 is the accumulation of E1 into E2. Because the number of product terms modulo three is two in this case, E2 contains the desired set of slaves.

Methods 2500, 2800, 3100 and 3400 do not in general generate a minimal sequence of commands for a given arbitrarily complex condition expressed in sum-of-products form. A shorter command sequence can be obtained when an arbitrarily complex condition can be written by an expression that can be generated by the following grammar:

ln-expression: (ln-expression)*primitive_condition ln-expression: ln-expression+primitive_condition ln-expression: primitive_condition where ln-expression is the name given to this kind of expression, namely, left-nesting expression. A ln-expression can be written as, ((...(((c1) op2 c2) op3 c3)...) opN cN), where c1, c2, ..., cN are primitive conditions and op2, op3, ..., opN are either * (AND) or +(OR) binary operators. The ln-expression as written above is more heavily parenthetically bracketed than necessary and some parenthesis may be deleted as long as the logic is preserved. Left-nesting expressions can be executed using only two of the three states of the three-state machine. An arbitrarily complex condition such as A*B+A*C can be expressed according to the grammar as (B+C)*A. The aforementioned canonical method over the former, sum-of-products, expression requires six commands to execute and uses three states. The latter, left-nesting, expression can be computed with only three commands and uses only two states. Not every arbitrarily complex conditions can be expressed by a single left-nested expression, but any complex condition can be expressed by a sum of left-nested expressions, which requires fewer commands than the canonical sum-of-products form. For example, the condition A*B+A*C+ ~A*~B+~A*~C can be written as a sum of two left-nested expressions: (B+C)*A+(~B+~C)*~A; the former requires twelve commands, while the latter only eight. As with the canonical sum-of-products method, which uses the third state to accumulate products, the method for executing sum-of-left-nested-expressions uses the third state to accumulate left-nested expressions.

As mentioned above, the present three-selection-state machine is capable of isolating or selecting slaves that satisfy any possible condition expressed by a left-nested expression. Specifically, the invention is necessary and sufficient to isolate and select slaves satisfying those conditions that are expressed by a sum-of-left-nested-expressions. The invention enables this capability because a separate condition (or set of conditions), each corresponding to a set of slaves, can be isolated in any one of the three states at any given time. Therefore, operations on two sets of conditions, in two of the respective states, can be performed without affecting or being affected by the conditions held in the third state. Specific instances of left-nested-expressions handled by the invention are now presented.

Figure 37:
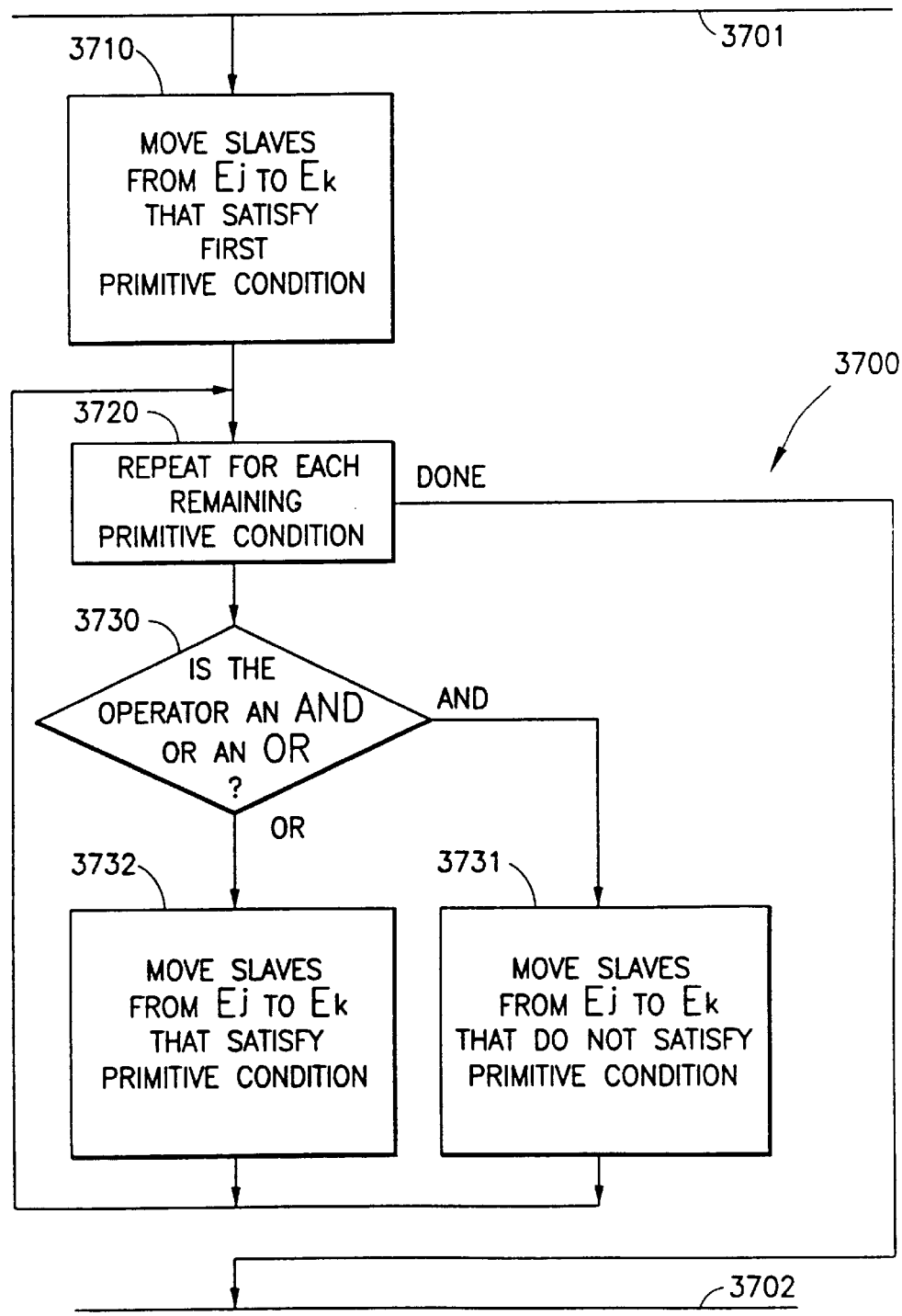
FIG. 37 describes a method that computes a single left-nested expression using only two states.

The method for computing the sequence of commands necessary to transfer from a set Ej to a set Ek slaves in set Ej that satisfy a condition given as a ln-expression is shown in FIG. 37. Method 3700 takes as input 3701 two different sets Ej and Ek of the possible three sets E1, E2 and E3, and a ln-expression, $((\ldots(((c1)\ op2\ c2)\ op3\ c3)\ldots)\ opN\ cN)$. Method 3700 outputs a configuration 3702 whereby all slaves in set Ej that satisfy the ln-expression of input 3701 are moved to set Ek. If set Ek was not empty to start with, a side effect of the method is that all slaves originally in set Ek that did not satisfy the reduced condition $(\ldots((cM)\ op\ \ldots)\ldots opN\ cN))$ where M is such that opM is the first * (AND) operator in the ln-expression, have moved to set Ej. That can be represented mathematically as $$Ej=Ek*\sim((cm\ op\ \ldots)opN\ cN)+Ej*\sim(c1\ op\ \ldots)\ opN\ cN)$$

$$Ek=Ek*\ ((cm\ op\ \ldots)\ opN\ cN)+Ej*\ ((c1\ op\ \ldots)\ opN\ cN)$$

where m such that op2, op3, . . . , opm−1=OR and opm= AND

Method 3700 begins with step 3710, which issues a command that causes all slaves in set Ej that satisfy the leftmost (first) primitive condition c1 to move to set Ek. Step 3720 controls the iteration over the binary operators and attendant right operands, from the leftmost to the rightmost, that is, from op2 to opN and their attendant c2 to cN. For each operator opi, where i varies from 2 to N, step 3730 tests which binary operator is opi. If opi is the AND operator *, step 3731 is executed; otherwise, opi is the OR operator+, in which case step 3732 is executed. Step 3731 issues a command that causes all slaves in set Ek that do not satisfy primitive condition ci to move to set Ej. Step 3732 issues a command that causes all slaves in set Ej that satisfy primitive condition ci to move to set Ek. After the last iteration, over opN and cN, step 3720 terminates the iteration. That terminates the method.

Figure 38:
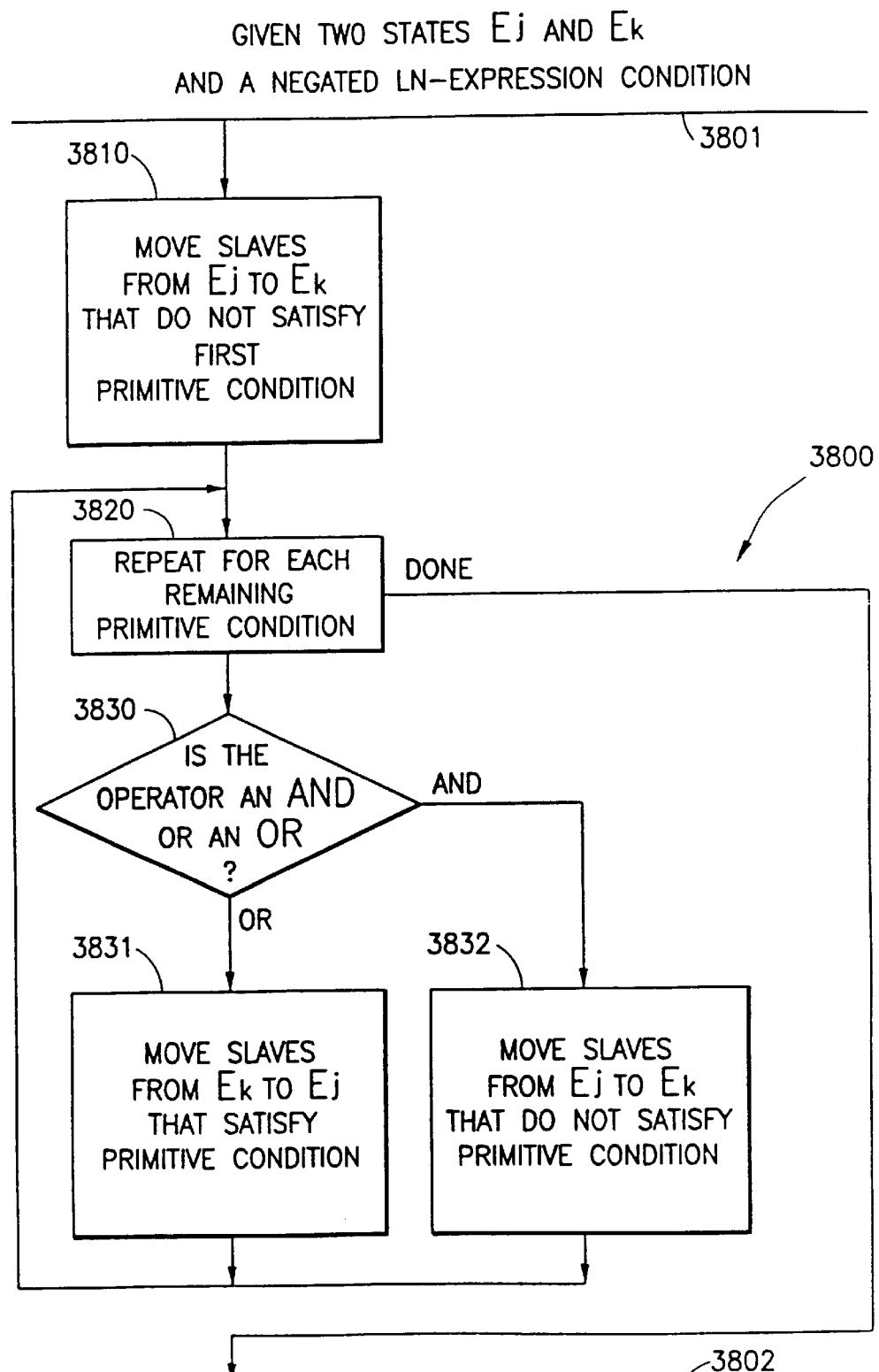
FIG. 38 describes a method that computes the negation of a single left-nested expression using only two states.

An important variation of method 3700 is shown in FIG. 38. Method 3800 computes the sequence of commands necessary to transfer from a set Ej to a set Ek slaves in set Ej that satisfy a condition given as the negation of a ln-expression. Method 3800 takes as an input 3801 two different sets Ej and Ek of the possible three sets E1, E2 and E3, and a condition in the form of a negated ln-expression, $\sim((\ldots(((c1)\ op2\ c2)\ op3\ c3)\ldots)\ opN\ cN)$. Method 3800 outputs a configuration 3802 whereby all slaves in set Ej that satisfy the negated ln-expression of input 3801 are moved to set Ek. If set Ek was not empty to start with, a side effect of the method is that all slaves originally in set Ek that did not satisfy the reduced condition $\sim(\ldots((cM)\ op\ \ldots)\ldots opN\ cN)$, where M is such that opM is the first+(OR) operator in the ln-expression, have moved to set Ej. That can be represented mathematically as $$Ej=Ek*((cm\ op\ \ldots)\ opN\ cN)+Ej*\ ((c1\ op\ \ldots)\ opN\ cN)$$

$$Ek=Ek*\sim((cm\ op\ \ldots)\ opN\ cN)+Ej*\sim((c1\ op\ \ldots)\ opN\ cN)$$

where m such that op2, op3, . . . , opm−1=AND and opm=OR

Method 3800 begins with step 3810, which issues a command that causes all slaves in set Ej that do not satisfy the leftmost (first) primitive condition c1 to move to set Ek. Step 3820 controls the iteration over the binary operators and attendant right operands, from the leftmost to the rightmost, that is, from op2 to opN and their attendant c2 to cN. For each operator opi, where i varies from 2 to N, step 3830 tests which binary operator is opi. If opi is the OR operator +, step 3831 is executed; otherwise, opi is the AND operator *, in which case step 3832 is executed. Step 3831 issues a command that causes all slaves in set Ek that satisfy primitive condition ci to move to set Ej. Step 3832 issues a command that causes all slaves in set Ej that do not satisfy primitive condition ci to move to set Ek. After the last iteration, over opN and cN, step 3820 terminates. That terminates the method.

By expressing the minimized sum-of-products condition A*C+B*C, used in previous examples, as an ln-expression (A+B)*C, either method 3700 or 3800 can be used to generate a sequence of commands that is shorter than the sequence generated by method 2500, 2800, 3100 or 3400. The latter sequence is six commands long, as shown in FIGS. 27, 30, 33, and 36. Both methods 3700 and 3800 generate a sequence that is three commands long. The example sequence 3910 generated by method 3700 is shown in FIG. 39. The example sequence 4010 generated by method 3800 is shown in FIG. 40. They both start with the default initial configuration where all slaves are in set E1, as shown in rows 3900 and 4000. In both examples j=1, k=2 and l=3. Method 3700 generates the sequence T12(A), T12(B) and T21($\sim$C). Commands T12(A) and T12(B) put the partial condition (A+B) in set E2 as shown in rows 3901 and 3902. Command T21($\sim$C) results in the desired condition (A+B)*C in set E2 as shown in row 3903. Method 3800 generates the sequence T12($\sim$A), T21(B) and T12($\sim$C). Commands T12($\sim$A) and T21(B) put the partial condition (A+B) in set E1 as shown in rows 4001 and 4002. Command T12($\sim$C) results in the desired condition (A+B)*C in set E1 as shown in row 4003.

Note from the method descriptions of FIGS. 37 and 38, and the examples of FIGS. 39 and 40, that the third set E3 is not used. It is an important property of conditions written as a single ln-expression, that they require only two of the three states of a three-state machine. This property permits the use of the third state, that is, of set E3, as an accumulator of ln-expressions. While not all arbitrarily complex conditions can be expressed by a single ln-expression, any arbitrary complex condition can be expressed by a sum-of-ln-expressions. It is possible therefore to recode methods 2500, 2800, 3100 and 3400 to work on sum-on-ln-expressions.

Figure 41:
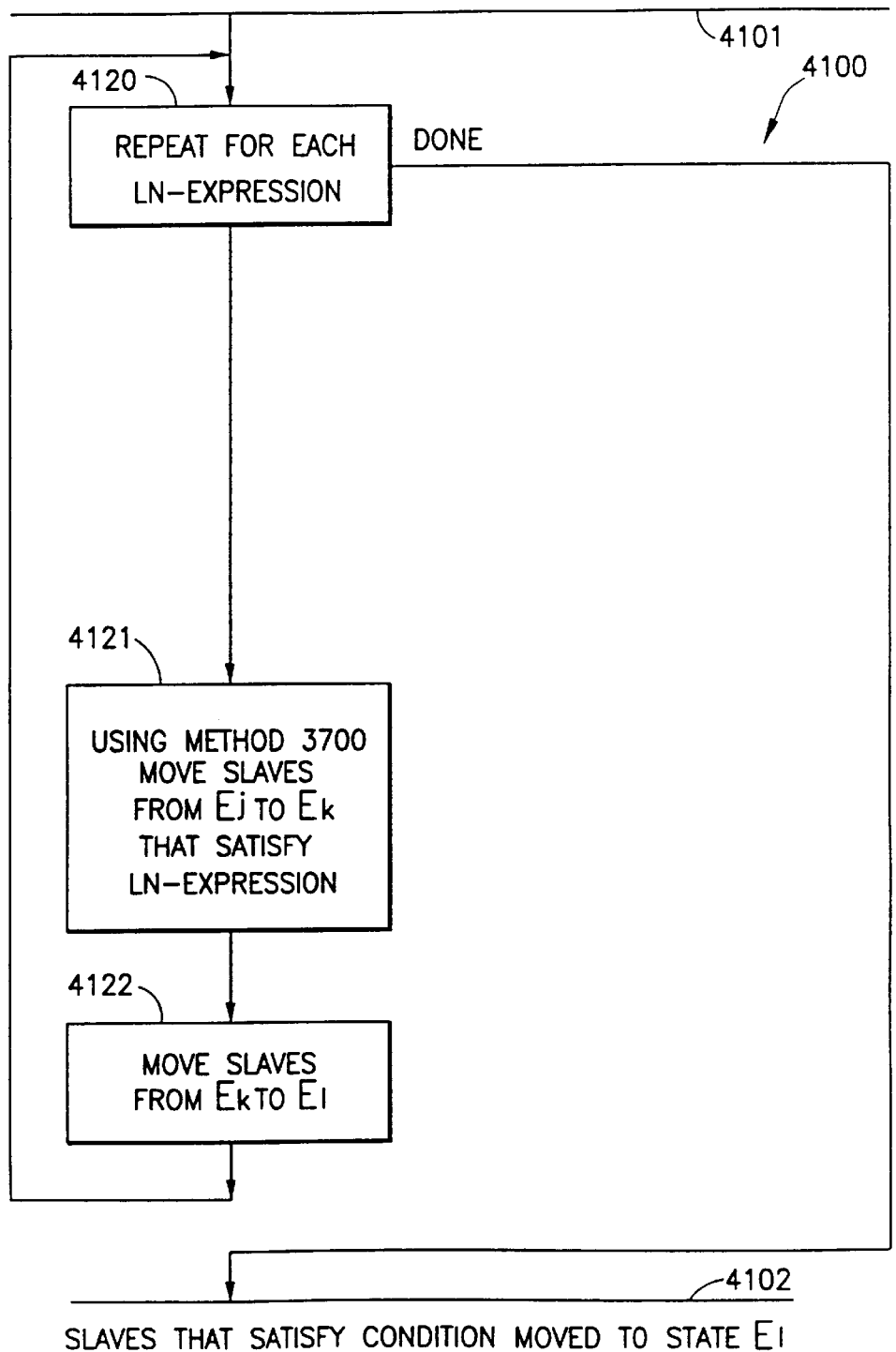
FIG. 41 describes a method that computes a condition written in sum-of-left-nested-expressions form whereby the left-nested expressions are built in a second state and the sum is accumulated in a third state.

Method 2500 is recoded in FIG. 41 for sum-of-ln-expressions. Method 4100 takes an input 4101 three sets Ej, Ek and El, that is, some permutation of sets E1, E2 and E3, and a condition written as a sum-of-ln-expressions, n1+n2+. . . +nN. Assuming, for simplicity, that set Ek is empty at the start of the method. Method 4100 outputs a configuration 4102 whereby all slaves in set Ej that satisfy the sum-of-ln-expressions condition 4101 are moved to set E1. That can be represented mathematically as $$Ej=Ej*\sim(n1+n2+\ldots+nN)$$

$$Ek=0$$

$$El=El+Ej*(n1+n2+\ldots+nN)$$

The main step 4120 controls the iteration over all ln-expressions of condition 4101. For each ln-expression ni, where i varies from 1 to N, steps 4121 and 4122 are executed in that order. Step 4121 issues a sequence of commands defined by method 3700 that causes all slaves in set Ej that satisfy the ln-expression ni to move to set Ek. Step 4122 issues a command that causes all slaves in set Ek to move to set El. Iteration ends after the last ln-expression, nN, has been processed. That terminates the method.

Figure 42:
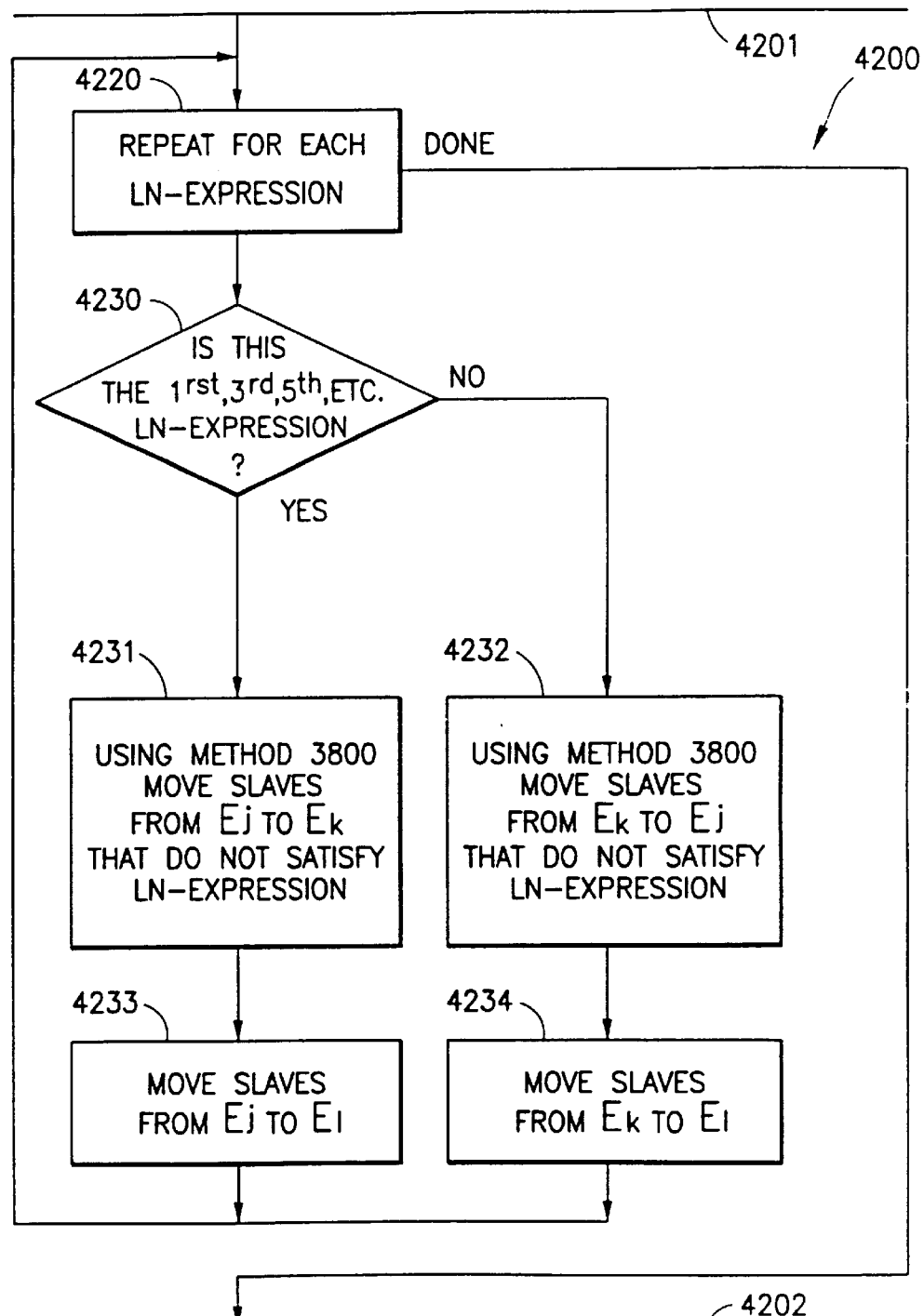
FIG. 42 describes a method that computes a condition written in sum-of-left-nested-expressions form whereby the left-nested expressions are built alternatively in a first and second states and the sum is accumulated in a third state.

Method 2800 is recoded in FIG. 42 for sum-of-ln-expressions. Method 4200 takes as input 4201 the same input as does method 4100. Method 4200 outputs a configuration 4202 whereby all slaves in Ej that satisfy the sum-of-ln-expressions condition 4201 are moved to set El, and either set Ej or set Ek will be empty depending on the number of ln-expressions. If the condition has an even number of ln-expressions, set Ek will be empty; otherwise, set Ej will be empty. That can be represented mathematically as $$El=El+Ej^*(n1+n2+\ldots+nN)$$

(if N is even) $Ej=Ej^*\sim(n1+n2+\ldots+nN), Ek=0$ (if N is odd) $Ek=Ej^*\sim(n1+n2+\ldots+nN), Ej=0$ The main step 4220 controls the iteration over all ln-expressions of condition 4201. For each ln-expression ni, where i varies from 1 to N, step 4230 tests whether i is odd or even. If i is odd, steps 4231 and 4233 are executed for ln-expression ni. If i is even, steps 4232 and 4234 are executed for ln-expression ni. Step 4231 issues a sequence of commands defined by method 3800 that causes all slaves in set Ej that do not satisfy ln-expression ni to move to set Ek. Step 4233 issues a command that causes all slaves in set Ej to move to set El. Similarly, step 4232 issues a sequence of commands defined by method 3800 that causes all slaves in set Ek that do not satisfy ln-expression ni to move to set Ej. Step 4234 issues a command that causes all slaves in set Ek to move to set El. The iteration ends after the last ln-expression, nP, has been processed by either steps 4231 and 4233, or steps 4232 and 4234. That terminates the method.

Figure 43:
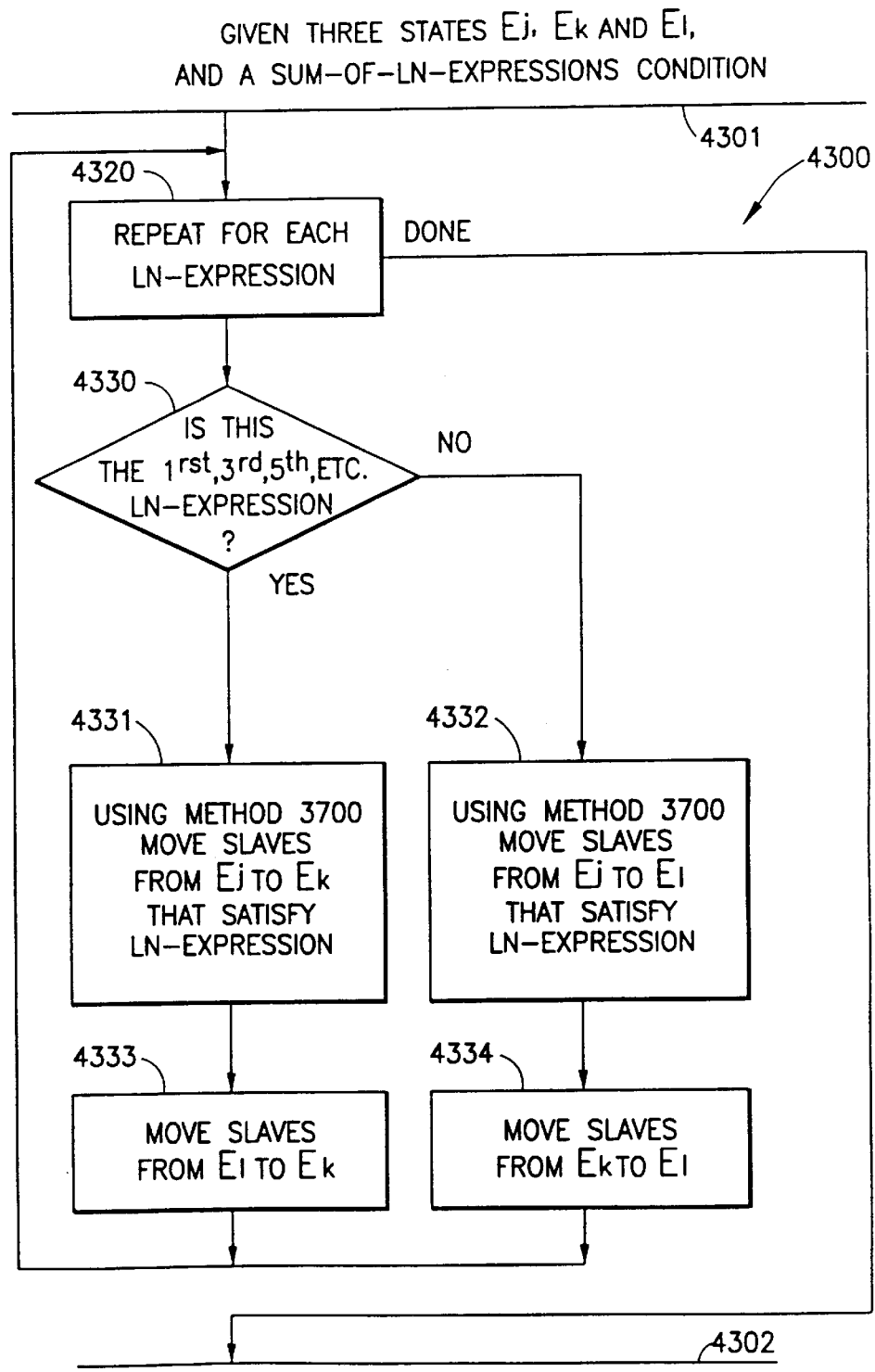
FIG. 43 describes a method that computes a condition written in sum-of-left-nested-expressions form whereby the left-nested expressions are built alternatively in a second and third states and the sum is accumulated in that second and third states, respectively.

Method 3100 is recoded in FIG. 43 for sum-of-ln-expressions. Method 4300 takes as input 4301 the same input as do methods 4100 and 4200. Method 4300 outputs a configuration 4302 whereby all slaves in set Ej that satisfy the sum-of-ln-expressions condition 4301 are moved to either set Ek or set El depending on the number of ln-expressions. If the condition has an even number of ln-expressions, set El will contain the desired slaves; otherwise, set Ek will. That can be represented mathematically as $$Ej=Ej^*\sim(n1+n2+\ldots+nN)$$

(if N is odd) $Ek=El+Ej^*(n1+n2+\ldots+nN), El=0$ (if N is even) $El=El+Ej^* (n1+n2+\ldots+nN), Ek=0$ The main step 4320 controls the iteration over all ln-expressions of condition 4301. For each ln-expression ni, where i varies from 1 to N, step 4330 tests whether i is odd or even. If i is odd, steps 4331 and 4333 are executed for ln-expression ni. If i is even, steps 4332 and 4334 are executed for ln-expression ni. Step 4331 issues a sequence of commands defined by method 3700 that causes all slaves in set Ej that satisfy ln-expression ni to move to set Ek. Step 4333 issues a command that causes all slaves in set El to move to set Ek. Similarly, step 4332 issues a sequence of commands defined by method 3700 that causes all slaves in set Ej that satisfy ln-expression ni to move to set El. Step 4334 issues a command that causes all slaves in set Ek to move to set El. The iteration ends after the last ln-expression, nN, is processed. That terminates the method.

Figure 44A:
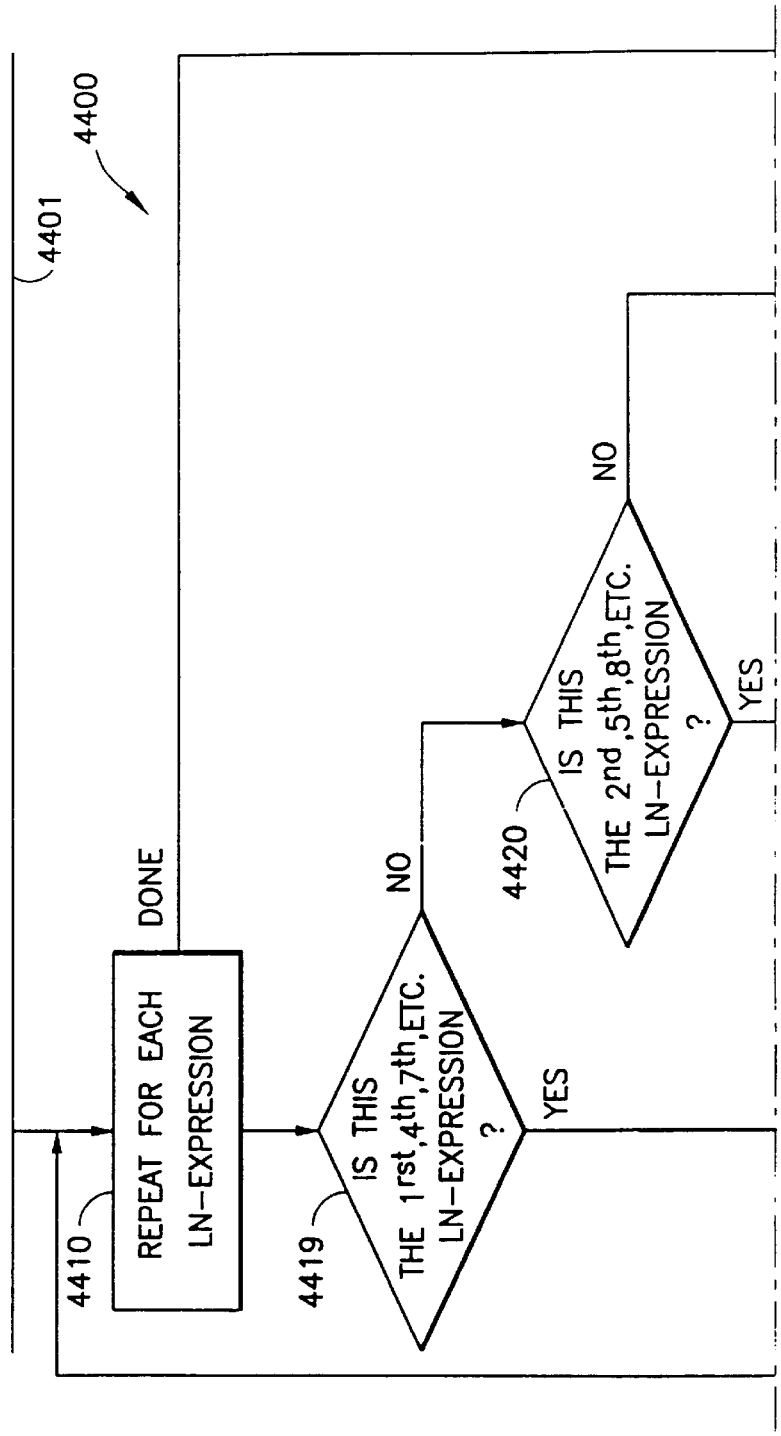
FIG. 44 describes a method that computes a condition written in sum-of-left-nested-expressions form whereby the left-nested expressions are built in a first, second and third states and the sum is accumulated in that first, second and third states, respectively.
Figure 44B:
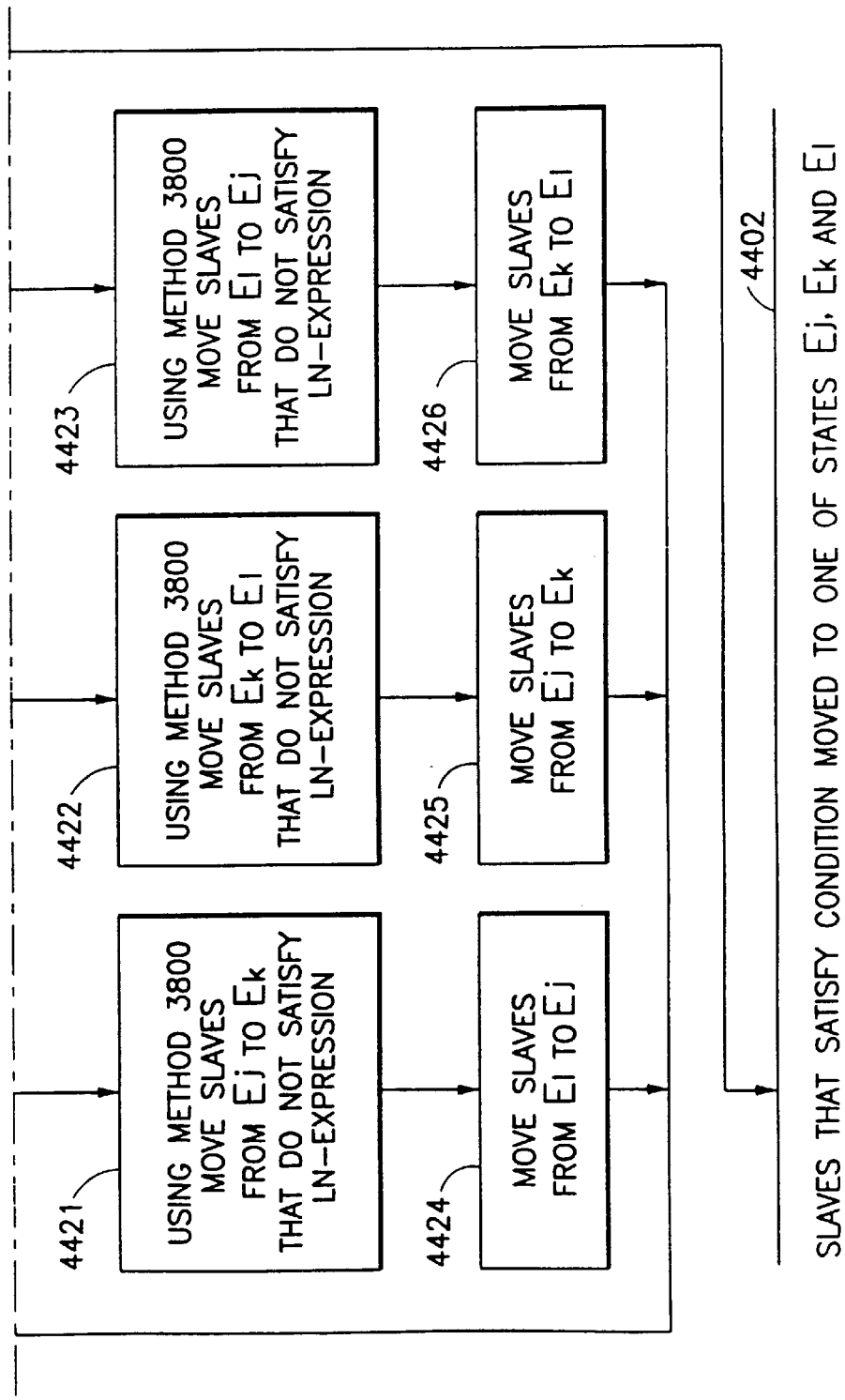

Method 3400 is recoded in FIG. 44 for sum-of-ln-expressions. Method 4400 takes as input 4401 the same input as do methods 4100, 4200 and 4300. Method 4400 outputs a configuration 4402 whereby all slaves in set Ej that satisfy the sum-of-ln-expressions condition 4401 are moved to set Ej, Ek or El depending on the number of ln-expressions. If the number of ln-expressions modulo three is one, that is, 1, 4, 7, etc., set Ej will end up containing the desired set of slaves. If the number of ln-expressions modulo three is two, that, 2, 5, 8, etc., set Ek will end up containing the desired set of slaves. If the number of ln-expressions modulo three is zero, that is, 3, 6, 9, etc., set El will end up containing the desired set of slaves. That can be represented mathematically as (if (N mod 3)=1) $Ej=El+Ej^*(n1+n2+\ldots+nN), El=0$ (if (N mod 3)=2) $Ek=El+Ej^* (n1+n2+\ldots+nN), Ej=0$ (if (N mod 3)=0) $El=El+Ej^* (n1+n2+\ldots+nN), Ek=0$ The main step 4410 controls the iteration over all ln-expressions of condition 4401. For each ln-expression ni, where i varies from 1 to N, steps 4419 and 4420 test whether i mod 3 is one, two or zero. If one, steps 4421 and 4424 are executed for ln-expression ni. If two, steps 4422 and 4425 are executed for ln-expression ni. If zero, steps 4423 and 4426 are executed for ln-expression ni. Step 4421 issues a sequence of commands defined by method 3800 that causes all slaves in set Ej that do not satisfy ln-expression ni to move to set Ek. Step 4424 issues a command that causes all slaves in set El to move to set Ej. Similarly, step 4422 issues a sequence of commands defined by method 3800 that causes all slaves in set Ek that do not satisfy ln-expression ni to move to set El. Step 4425 issues a command that causes all slaves in set Ej to move to set Ek. Similarly, step 4423 issues a sequence of commands defined by method 3800 that causes all slaves in set El that do not satisfy ln-expression ni to move to set Ej. Step 4426 issues a command that causes all slaves in set Ek to move to set El. The iteration ends after the last ln-expression, nN, is processed. That terminates the method.

For example, the condition $A^*B+A^*C+\sim A^*\sim C$, which would require ten commands if handled by any of methods 2500, 2800, 3100 or 3400, can be rewritten as $(B+C)^*A+ \sim A^*\sim B^*\sim C$ and handled by any of methods 4100, 4200, 4300 and 4400, in which case only eight commands are necessary. In the particular case of method 4100 the eight commands are T12(B), T12(C), T21(~A), T23(1), T12(~A), T21(B), T21(C), and T23(l).

As evident by the examples and method descriptions, not all possible transitions of the three-state machine need be available. Methods 2500 and 4100 can be executed on any of three-state machines 400, 500, 600, or 700. Methods 2800 and 4200 can be executed on any of three-state machines 400 or 500. Methods 3100 and 4300 can be executed on any of three-state machines 400 or 500. Methods 3400 and 4400 can be executed on any of three-state machines 400, 500, 600 and 800. Therefore for three-state machines 400 and 500, methods 2500, 2800, 3100, 3400, 4100, 4200, 4300 and 4400 can be used singly or in combination. For three-state machine 600, methods 2500, 3400, 4100 and 4400 can be used singly or in combination. For three-state machine 700, only methods 2500 and 4100 can be used singly or in combination. For three-state machine 800, only methods 3400 and 4400 can be used singly or in combination.

Other state machines are possible as long as any of three-state machines 400, 500, 600, 700 or 800 remains a corner-stone of the architecture. More states may be added and different transition combinations can be used, any of which could be realized by those skilled in the art given the disclosure presented herein, and depending upon the particular specifications desired. Moreover concomitant variations in the methods herein described and the form by which conditions are expressed and input to the methods will immediately become apparent to those skilled in the art. For example, iteration over elements of an ln-expression could be handled through recursion instead. They can utilize the teachings of this disclosure to create efficient operative embodiments of the system and methods described and claimed. These embodiments are also within the contemplation of the inventor.

I claim:

1. A state machine slave comprising:

three or more states, being at least a first state, a second state, and a third state, the slave being in the first state;

a memory with one or more information values;

a receiving unit for receiving one or more commands in a command sequence, each of the commands specifying a "transfer from state", a "transfer to state", and a primitive condition; and a processing unit that causes the slave to move to the second state being the "transfer to state" if the first state is the same as the "transfer from state" and one or more of the information values satisfies the primitive condition, the slave being moved to the third state by another command in the command sequence only if the slave is in the second state, and the slave, once moved into to the third state, remaining in the third state, wherein two of the states reverse roles after an end of one or more subsequences in the sequence of commands.

2. A state machine slave, as in claim 1, wherein said at least two of the three states exchange roles with each other after an end of one or more subsequences in the sequence of commands as follows: the first and second states reverse roles.

3. A state machine slave, as in claim 2, where the first and second states reverse roles at the end of each subsequence corresponding to a term in a sum of ln-expression.

4. A state machine slave, as in claim 3, where the sum of ln-expression is a sum of products.

5. A state machine slave, as in claim 1, wherein said at least two of the three states exchange roles with each other after an end of one or more subsequences in the sequence of commands as follows: the second and third states reverse roles.

6. A state machine slave, as in claim 5, where the second and third states reverse roles at the end of each subsequence corresponding to a term in a sum of ln-expression.

7. A state machine slave, as in claim 6, where the sum of ln-expression is a sum of products.

8. A state machine slave, as in claim 1, wherein said at least two of the three states exchange roles with each other after an end of one or more subsequences in the sequence of commands as follows: the first state assumes the role of the second state, the second state assumes the role of the third state, and the third state assumes the role of the first state.

9. A state machine slave, as in claim 8, where the first, second, and third states cycle roles at the end of each subsequence corresponding to a term in a sum of ln-expression.

10. A state machine slave, as in claim 9, where the sum of ln-expression is a sum of products.

11. A system for selecting a subset of slaves that satisfy a selection criterion, comprising:

a master unit for communicating a selection criterion command sequence to a plurality of slaves, the selection criterion command sequence representing the selection criterion;

each slave of said plurality of slaves at any time being in one of three or more different possible selection states, said states being used for processing the selection criterion command sequence and for determining whether or not said each slave satisfies the selection criterion represented by the selection criterion command sequence;

a memory in said each slave containing at least one information value for evaluation of primitive selection conditions;

a receiving unit in said each slave for receiving the selection criterion command sequence from the master unit, each command in the selection criterion command sequence specifying a "from" state, a "to" state, and a primitive selection condition; and a processing unit in said each slave that processes each successive command in the selection criterion command sequence by moving the slave into the "to" state if and only if the slave is already in the "from" state and the at least one information value satisfies the primitive condition, whereby said each slave is deemed to be selected if said each slave is in a particular selection state after the processing unit in said each slave has processed the selection criterion command sequence.

12. A system, as in claim 11, where the master unit is a base station, the slaves are radio frequency tags, and the base station communicates with the radio frequency tags with a radio frequency signal.

13. A system, as in claim 11, where the selection criterion command sequence moves one or more first sets of slaves from a first state to a second state, then moves one or more second sets of slaves from the second state to the first state, and then moves the slaves remaining in the second state to a third state.

14. A system, as in claim 11, where the selection criterion command sequence moves one or more first sets of slaves from a first state to a second state, then moves one or more second sets of slaves from the second state to the first state, and then moves the slaves remaining in the first state to a third state.

15. A system, as in claim 11, where the selection criterion command sequence moves one or more first sets of slaves from a first state to a second state and then moves one or more second sets of slaves from the second state to a third state.

16. A system, as in claim 11, where the selection criterion command sequence moves one or more first sets of slaves from a first state to a second state and then moves one or more second sets of slaves from the first state to a third state.

17. A method for selecting a subset of slaves that satisfy a selection criterion, comprising the steps of:

storing at least one information value in each of a plurality of slaves for evaluating primitive selection conditions;

representing a selection criterion as a selection criterion command sequence, each command in the selection criterion command sequence specifying a "from"state, a "to" state, and a primitive selection condition;

communicating the selection criterion command sequence to the plurality of slaves, each slave of said plurality of slaves at any time being in one of three or more different selection states used for processing the selection criterion command sequence and for determining whether or not said each slave satisfies the selection criterion represented by the selection criterion command sequence;

processing each successive command in the selection criterion command sequence at said each slave by moving said each slave into the "to" state if and only if the slave is already in the "from" state and the at least one information value satisfies the primitive condition; and then deeming said each slave in a particular selection state to be selected.

18. A state machine slave for responding to a selection criterion command sequence from a master unit, the selection criterion command sequence implementing a selection criterion, the state machine slave comprising:

first, second and third selection states for processing the selection criterion command sequence and for determining whether or not the slave satisfies the selection criterion represented by the selection criterion command sequence;

a memory containing at least one information value for evaluating primitive selection conditions;

a receiving unit for receiving the selection criterion command sequence, each command in the selection criterion command sequence specifying a "from" state, a "to" state, and a primitive selection condition; and a processing unit that process each successive command in the selection criterion command sequence by moving the slave into the "to" state if and only if the slave is already in the "from" state and the at least one information value satisfies the primitive condition, whereby the slave is deemed to be selected if the slave is in a particular one of the three states after the processing unit has processed the selection criterion command sequence.

* * * * *